(12) United States Patent
Yakan

(10) Patent No.: US 11,102,206 B2
(45) Date of Patent: Aug. 24, 2021

(54) METHODS AND APPARATUS FOR ESTABLISHING SHARED MEMORY SPACES FOR DATA ACCESS AND DISTRIBUTION

(71) Applicant: PostOak.Today LLC, New York, NY (US)

(72) Inventor: Hani Yakan, Houston, TX (US)

(73) Assignee: PostOak.Today LLC, New York, NY (US)

( * ) Notice: Subject to any disclaimer, the term of this patent is extended or adjusted under 35 U.S.C. 154(b) by 0 days.

(21) Appl. No.: 16/532,136

(22) Filed: Aug. 5, 2019

(65) Prior Publication Data

US 2020/0213313 A1 Jul. 2, 2020

Related U.S. Application Data

(63) Continuation of application No. 15/456,228, filed on Mar. 10, 2017, now Pat. No. 10,375,074.

(Continued)

(51) Int. Cl.
| | |
|---|---|
| *G06F 40/166* | (2020.01) |
| *G06F 11/14* | (2006.01) |
| *G06F 13/14* | (2006.01) |
| *G06F 3/06* | (2006.01) |
| *H04L 29/06* | (2006.01) |
| *G06F 3/00* | (2006.01) |
| *G06F 3/0481* | (2013.01) |
| *G06F 21/62* | (2013.01) |
| *G06F 9/451* | (2018.01) |

(Continued)

(52) U.S. Cl.
CPC .............. *H04L 63/10* (2013.01); *G06F 3/002* (2013.01); *G06F 3/0481* (2013.01); *G06F 9/452* (2018.02); *G06F 21/6218* (2013.01); *G06F 40/166* (2020.01); *G06K 7/1413* (2013.01); *G06Q 30/0267* (2013.01); *H04L 63/102* (2013.01)

(58) Field of Classification Search
USPC ........ 715/753, 262, 238, 225, 224, 223, 221
See application file for complete search history.

(56) References Cited

U.S. PATENT DOCUMENTS

| | | | | |
|---|---|---|---|---|
| 6,629,153 B1 * | 9/2003 | Gupta | ..................... | G06F 9/465 719/316 |
| 7,328,316 B2 * | 2/2008 | Moir | ....................... | G06F 9/524 711/147 |

(Continued)

*Primary Examiner* — Jude Jean Gilles
(74) *Attorney, Agent, or Firm* — Christopher R. Hutter

(57) ABSTRACT

In some implementations, methods and apparatuses herein relate to generating shared memory spaces that can share files or applications between users and between user devices. For example, a processor can allocate a first portion of a memory of a client device to serve as a shared memory space for at least one dynamic application object, and instantiating a user interface on a display associated with the client device. The user interface can be based on a content of the shared memory space and representing the at least one dynamic application object. A processor can define access rights for a user of a second electronic device for receiving a copy of the instantiated user interface. The processor can define user rights for the user for use of the at least one dynamic application object with the second electronic device. The at least one dynamic application object can be a data file or a live user experience.

18 Claims, 12 Drawing Sheets

Related U.S. Application Data

(60) Provisional application No. 62/307,161, filed on Mar. 11, 2016.

(51) Int. Cl.
*G06Q 30/02* (2012.01)
*G06K 7/14* (2006.01)

(56) References Cited

U.S. PATENT DOCUMENTS

| | | | | |
|---|---|---|---|---|
| 10,375,074 | B2* | 8/2019 | Yakan | G06F 3/002 |
| 2003/0229620 | A1* | 12/2003 | Carlson | G06F 16/24553 |
| 2009/0271588 | A1* | 10/2009 | Bareness | G06F 9/5022 |
| | | | | 711/170 |
| 2012/0124305 | A1* | 5/2012 | Weissman | G06F 12/08 |
| | | | | 711/160 |
| 2013/0290595 | A1* | 10/2013 | Weissman | G06F 16/217 |
| | | | | 711/6 |
| 2014/0143516 | A1* | 5/2014 | Dawson | G06F 12/00 |
| | | | | 711/171 |
| 2014/0282454 | A1* | 9/2014 | Bai | G06F 8/433 |
| | | | | 717/157 |
| 2016/0062794 | A1* | 3/2016 | Charania | G06F 16/83 |
| | | | | 718/102 |
| 2017/0054659 | A1* | 2/2017 | Ergin | H04L 45/38 |

* cited by examiner

METHODS AND APPARATUS FOR ESTABLISHING SHARED MEMORY SPACES FOR DATA ACCESS AND DISTRIBUTION

CROSS-REFERENCE TO RELATED APPLICATIONS

This application is a continuation of U.S. patent application Ser. No. 15/456,228, filed Mar. 10, 2017, which claims priority to and the benefit of U.S. Provisional Application No. 62/307,161, filed Mar. 11, 2016, the entire contents of each of which are herein expressly incorporated by reference in their entireties.

FIELD

The methods and apparatus described herein are generally related, for example, to establishing shared memory spaces for data access and distribution.

BACKGROUND

In some known systems, users can simultaneously edit a document stored at a server. Such known systems, however, only allow editing of documents such as word documents and image documents. Such known systems, for example, cannot allow a user to generate a workspace including applications, with which other users can interact and/or modify, and through which the other users can provide information to the user that generates the workspace. Additionally, such known systems do not generally allow for users to host their own workspaces in a secure manner.

Accordingly, a need exists for methods and apparatus that allow users to share workspaces that can include multiple types of files and/or applications that can be edited by and/or interacted with numerous other users, and that can be securely hosted by user devices.

SUMMARY

Figure 1:
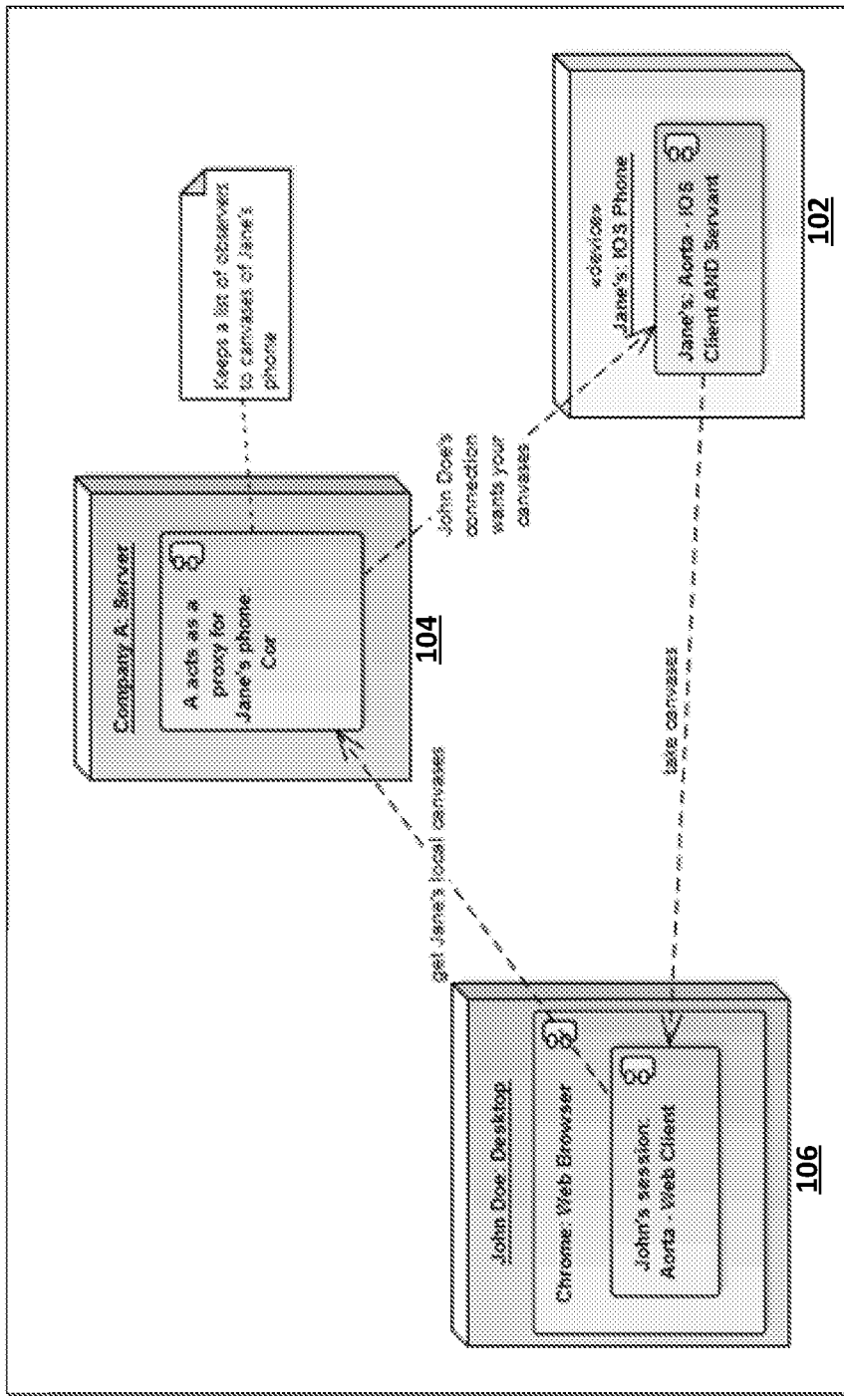
FIG. 1 is a schematic diagram illustrating a canvas sharing network, according to an embodiment.

In some implementations, a method can include allocating a first portion of a memory of a client device to serve as a shared memory space for at least one dynamic application object, and instantiating a user interface on a display associated with the client device. The user interface can be based on a content of the shared memory space and representing the at least one dynamic application object. The method further includes defining access rights for a user of a second electronic device for receiving a copy of the instantiated user interface. The method further includes defining user rights for the user for use of the at least one dynamic application object with the second electronic device. The at least one dynamic application object can be at least one of a document, a photograph, live video, a website, a map, music, an application or a live user experience.

In some implementations, a method can include allocating a portion of a memory of a client device to serve as a shared memory, and instantiating a collaborative work space on the client device. The collaborative work space can represent content of the shared memory space. The method can also include associating the collaborative work space with a plurality of electronic devices that excludes the client device such that the collaborative work space is simultaneously accessible to the plurality of additional electronic devices. The collaborative work space and associated shared memory can operate to augment the memory of each electronic device from the plurality of electronic devices.

In some implementations, a method can include allocating a first portion of a memory of a client device to serve as a shared memory space. The method can also include instantiating a user work space representing a content of the shared memory space to display on an electronic display associated with the client device. The method can include assigning to the user work space a bar code that identifies and facilitates providing immediate access to the user work space by a second electronic device upon a scanning of the bar code by the second electronic device.

In some implementations, a method can include scanning a first bar code from a display on a first electronic display of a first collaborative work space. The method can further include accessing the first collaborative work space using the scanned first bar code, and retrieving a data object from the first collaborative work space. The method can include scanning a second bar code from a display on a second electronic device of a second collaborative work space, and accessing the second collaborative work space using the scanned second bar code. The method can include copying the data object to the second collaborative work space.

In some implementations, a method can include generating an interactive object including a plurality of components, and allocating a portion of a memory of a client device to serve as a shared memory. The method can include instantiating a collaborative work space on the client device. The collaborative work space can represent content of the shared memory space, including representing the interactive object. The method can include associating the collaborative work space with a second electronic device such that the collaborative work space is simultaneously accessible by the first and second electronic devices. The method can include receiving, from the second electronic device, instructions for modifying the interactive object, and modifying the interactive object based on the received instructions. The method can include modifying the collaborative work space to reflect that the interactive object was modified.

DETAILED DESCRIPTION OF THE DRAWINGS

In some implementations, a user can interact with a canvas (also referred to as a "clipboard" and/or "persistent workspace" herein). A canvas can be a data structure representing a file directory (e.g., including a list of files in the file directory, file types, and/or the like), and including permissions for the files (e.g., specifications of which users can access the files, and/or the like). A canvas can include information placed onto the canvas, e.g., including documents, images, and/or other information. Users can also deploy applications (e.g., calendar applications including meeting invitation and/or appointment viewing functionality, survey applications, and/or similar applications) within their canvas, e.g., by adding a file including application code to the file directory corresponding to the canvas. Users can grant access to other users, such that the other users can access the information on the canvas, and/or can interact with the information on the canvas. For example, users with access to the canvas can edit data in a document on the canvas, can draw on images on the clipboard, and/or can answer a survey on the canvas, e.g., by providing input to the canvas (e.g., text input in the document on the canvas, survey answers in text boxes and/or by selecting radio buttons and/or checkboxes, and/or similar input).

Changes made by each user can be stored at their local copy of the canvas, and can also be transmitted to the canvas owner's electronic device, and/or to a server that can process the changes before providing the changes to the canvas owner. The changes can also be reconciled with other changes (e.g., made by other users and/or by the canvas owner) to provide substantially real-time updates on the canvas (e.g., to provide updates that are reflected on the canvas as soon as the updates have been reconciled and/or otherwise processed, and received by the canvas owner). For example, the electronic device of the owner of the canvas and/or the server can receive results of other users' interactions with applications (e.g., survey results, acceptance of a meeting invitation, and/or the like) substantially in real time. The canvas owner's electronic device and/or the server can then send, substantially in real time (e.g., after reconciling changes being made by each user interacting with the canvas), the results of the interactions to other users interacting with the canvas.

Portions of data on a canvas can have different editing permissions; for example, the owner of the canvas can specify that users can interact with applications on the canvas, and specify that those users cannot edit documents and/or images on the canvas. Alternatively, the canvas owner can specify that certain users can edit some and/or all documents and/or images on the canvas, and that other users cannot edit any information on the canvas. Additionally, the canvas owner can specify that particular users can edit particular information (e.g., can interact with a specific application, and/or edit a particular document). In other words, a canvas owner can ensure that certain users can access and/or interact with certain types of information, particular documents and/or other information on the canvas, and/or that certain users can access and/or interact with the canvas generally, while other users cannot access certain types of information, the canvas generally, and/or the like.

For example, referring to FIG. 1, a canvas owner can add a document to her canvas by adding a document to a predefined directory for the user's canvas, e.g., on the canvas owner's electronic device 102 (e.g., a personal computer, a tablet, a mobile device such as a mobile phone, and/or a similar device). The canvas owner can set permissions for the document to determine whether other users can access the document, whether they can edit the document, and/or similar settings. The canvas owner can also set permissions for the canvas as a whole, e.g., to determine whether other users can access portions of the content on the canvas, whether other users can edit portions of the content on the canvas, and/or similar settings. The canvas owner's electronic device 102 can generate a canvas data structure (e.g., an XML, JSON, and/or similar data structure) that includes references to the document and/or to other files in the directory, permissions for the files in the directory, and/or other metadata.

The other users authorized to access the document can access the document using their own electronic devices 106. For example, using their electronic devices 106, the other users can access a web browser, an application installed on their electronic devices 106, and/or similar user interface, and can select the canvas owner's canvas in the user interface. The user interface can display previews of the files stored at the directory (e.g., including thumbnails for photographs, survey and/or application titles, and/or similar data), file names, and/or other information associated with the file. The other users can send, via the user interface, a message to the canvas owner's electronic device 102, and/or to a proxy server 104 (also referred to herein as a canvas server 104) that can handle messages sent to and/or from other user devices 106 when the other users select the canvas, e.g., to indicate to the canvas owner's electronic device 102 that a user is requesting access to the canvas, and/or to updates to the canvas. The proxy server 104 can then inform the canvas owner's electronic device 102 of any requests for the canvas (e.g., by informing the canvas owner's electronic device 102 of the other user devices 106 requesting access to the canvas). The canvas owner's electronic device 102 can then send the data (e.g., the document) associated with the canvas owner's canvas to the other user's devices 106. The canvas owner's electronic device 102 can determine whether or not the other users are authorized to access the canvas before sending the canvas. In some implementations, the proxy server 104 can determine whether or not the requesting users are authorized to access the canvas; if a user is not authorized to access the canvas, the proxy server 104 can choose not to forward the request to the canvas owner's electronic device 102. In some implementations, users can subscribe and/or "follow" the canvas owner's canvas. When the canvas owner updates and/or otherwise changes the canvas, either the canvas owner's electronic device 102 or the proxy server 104 can notify users following the canvas about the change.

Users can define multiple canvases including multiple types of information. Users can use web browsers and/or other user interfaces to view the information stored on each canvas, e.g., where data can be displayed as icons, previews of the files, and/or in some similar manner. Users can use application and/or information templates to define content to add to the canvas. Users that access a canvas can store a local copy and/or instance of the canvas, that can be automatically updated when the canvas owner updates her canvas. Canvas owners can also delete their canvases; in some implementations, when a canvas owner deletes a canvas, each local copy and/or instance of the canvas can also be deleted at the device of each user that has accessed the canvas, e.g., when a predetermined period of time has expired, and/or the like. For example, when a user deletes a canvas and/or information on the canvas, e.g., via her electronic device 102, the electronic device 102 can send a signal to other user's devices 106 indicating that the canvas and/or the information has been deleted, and/or can send a similar message to the proxy server 104. When the signal is sent to the proxy server 104, the proxy server 104 can send a signal to each of the other users' devices 106. In response to receiving the signal (e.g., from the electronic device 102 and/or the proxy server 104), the other users' devices 106 can delete their local copies of the canvas and/or of the deleted information on the canvas.

In some implementations, canvases can be shared and/or interacted with using desktop, mobile, and tablet platforms. Canvases can be broadcast (e.g., representations of the canvas can be sent to multiple user devices substantially simultaneously), and can allow for high speed copy-paste, drag-and-drop, and crop functionality for documents, images, and other data. In some implementations, canvas owners can broadcast their own media channels using canvases (e.g., by adding content to their canvases and sending signals to other devices including information representing the canvas), and can regulate which other users have access to the canvas. In some implementations, by using canvases for content sharing and/or transmission, user devices 102 and 106, and proxy servers 104, can allow for an efficient online content integration and broadcast system allowing for content to be hosted at local user devices, rather than at servers. For example, a canvas may not be stored at the proxy server 104; instead, the canvas can be stored at the canvas owner's electronic device 102, and local versions of the canvas can be stored at other users' electronic devices 106. In some implementations, canvas content can include, but is not limited to, photos, live video, websites, maps, music, documents, articles, applications, and a live user experience and/or live interactive application (also referred to as an "executing experiences" or "EES"), such as a live application (e.g., a different user canvas, and/or a similar live application). In some implementations, users can use canvases to work with a virtual group, e.g., by copying, pasting, dragging/dropping files, drawing on a private canvas, and/or by performing other collaborative actions. Users can also create view-only canvases to broadcast interactive content, and can secure their canvases across different platforms (e.g., Windows, MacOS, iOS, Chrome, Android, Windows Phone, and/or the like). In some implementations, users can use canvases to, for example, communicate with each other, draw on maps, transfer, share, and/or upload files, and/or act upon other data provided on the canvas. In some implementations, canvases can be public or private (e.g., can be viewable by other users or can be viewable by the canvas owner and not by other users), and/or can include a combination of public and private canvas data. In some implementations, the private canvas cannot be shared. The private canvas can consolidate other canvases running on the canvas owner's electronic devices. In some implementations, the canvas owner can be notified when the private canvas, and/or when the other canvases, have been accessed. In some implementations, the canvas can also be configured to clear itself (e.g., within a predetermined amount of time).

In some implementations, users can also share canvases by providing scannable codes (e.g., barcodes, quick response (QR) codes, and/or the like) in the canvas. Other users can scan the code for a canvas, e.g., by scanning a code appearing in the canvas using an electronic device (e.g., a mobile phone including a camera configured to detect and scan codes, and/or the like). Scanning a code can reveal a link and/or the canvas data structure, such that the other users can download the canvas locally on their electronic devices. Other users can also scan codes for live applications and/or other content in the canvas, can download the content using the codes, and can interact with the content locally on their electronic devices after downloading the content. Results of the interactions with the locally-stored content can be broadcasted (e.g., sent) to the proxy server 104, the canvas owner's electronic device 102, and/or to other users.

For example, in some implementations, users watching programming online and/or via a television can be presented with a canvas's code, where the canvas includes an application with which the users can interact (e.g., to perform actions that can be shown in the programming, and/or the like). In other implementations, a canvas code can include a coupon for a product (e.g., in an advertisement, a television show, and/or the like), a vCard (e.g., virtual business card), and/or the like. Using a canvas application running on the user's electronic device, the user can scan the canvas code to download the canvas, and/or content in the canvas. In other implementations, users can define and/or modify canvases such that the canvases appear to other users who are located in a specific geographic location. Said another way, a user can modify location settings for a canvas, such that the canvas is available to users within a predetermined location (e.g., within a predetermined distance from a canvas-owner-selected location). In some implementations, users can also drag a live application (e.g., an EES) onto a canvas interface instantiated on their electronic device. When other users interact with the live application, the results of said interaction can be displayed for and/or transmitted to each user accessing the canvas, and/or accessing the live application within the canvas (e.g., by displaying the results in the canvas itself, and/or by transmitting results of the interactions to each user's electronic device such that they store a local copy of the results. In some implementations, users can obtain the results in a text format, a comma-delimited format (e.g., a Microsoft Excel format), and/or other formats that can be exported, substantially in real-time, to other systems. In other implementations, users can design live applications for their canvases by using a live application design tool within a canvas application running on their electronic device, and/or by generating and storing a code file in the canvas directory that includes code that defines the live application functionality and user interface.

In some implementations, each canvas can also be added to a canvas network defined by a user. A canvas network can be associated with the user, and can include a number of canvases associated with the user. A canvas network can include a name, a description, a logo and/or image, and/or a list of subscribers. In some implementations, the canvas network can also be associated with a server (e.g., including canvas server 104, an external server, and/or a user's client device). In some implementations, subscribers can access a canvas network to which they are subscribed, but cannot access a canvas network to which they are not subscribed. In this manner, canvas networks can be private by default. In some implementations, users can specify whether a canvas network is private or public. Users can access canvases on public canvas networks, even if they have not subscribed to the public canvas network. In some implementations, each canvas associated with a canvas network may be public or private. Thus, even if a subscriber subscribes to a canvas network and/or accesses a public network, the subscriber may be unable to view private canvases within that canvas network. In some implementations, users can also generate collections of canvases within each canvas network. For example, a user can associate multiple canvases with each other, so as to generate a "stack" of canvases that can be accessed and/or shared together. A user can select a first canvas, and can select an option to create a stack with a second canvas, or can select an existing canvas stack. The user can select a second canvas with which to create a stack including the first canvas and the second canvas, or can select a stack such that the first canvas is included in the selected stack. The canvas server 104 can store a list of identifiers associated with each canvas in the stack in the canvas data structure for the first canvas and the second canvas. In some implementations, each canvas network can represent and/or be associated with a different instance of a server. For example, if a user hosts an instance of the canvas server 104 on a client device, that client device may be associated with a first canvas network, and the canvas server 104 can be associated with a second canvas network. In this manner, each instance of a server can serve as a canvas network of canvases instantiated at that server, and each canvas network can include collections of canvases generated by each user. In some implementations, the canvas server 104 can authenticate a user accessing the canvas network associated with the canvas server 104, e.g., by comparing an identifier of the user to identifiers of user accounts stored at the canvas server 104 (e.g., in a database and/or memory location of the canvas server 104). If the user identifier matches an identifier in a user account record stored at the canvas server 104, the canvas server 104 can allow that user to access public canvases within the canvas network, and/or private canvases to which the user is subscribed. If the user identifier does not match an identifier in the user account records stored at the canvas server 104, the canvas server 104 can determine that the user does not have permission to access the network.

Figure 2:
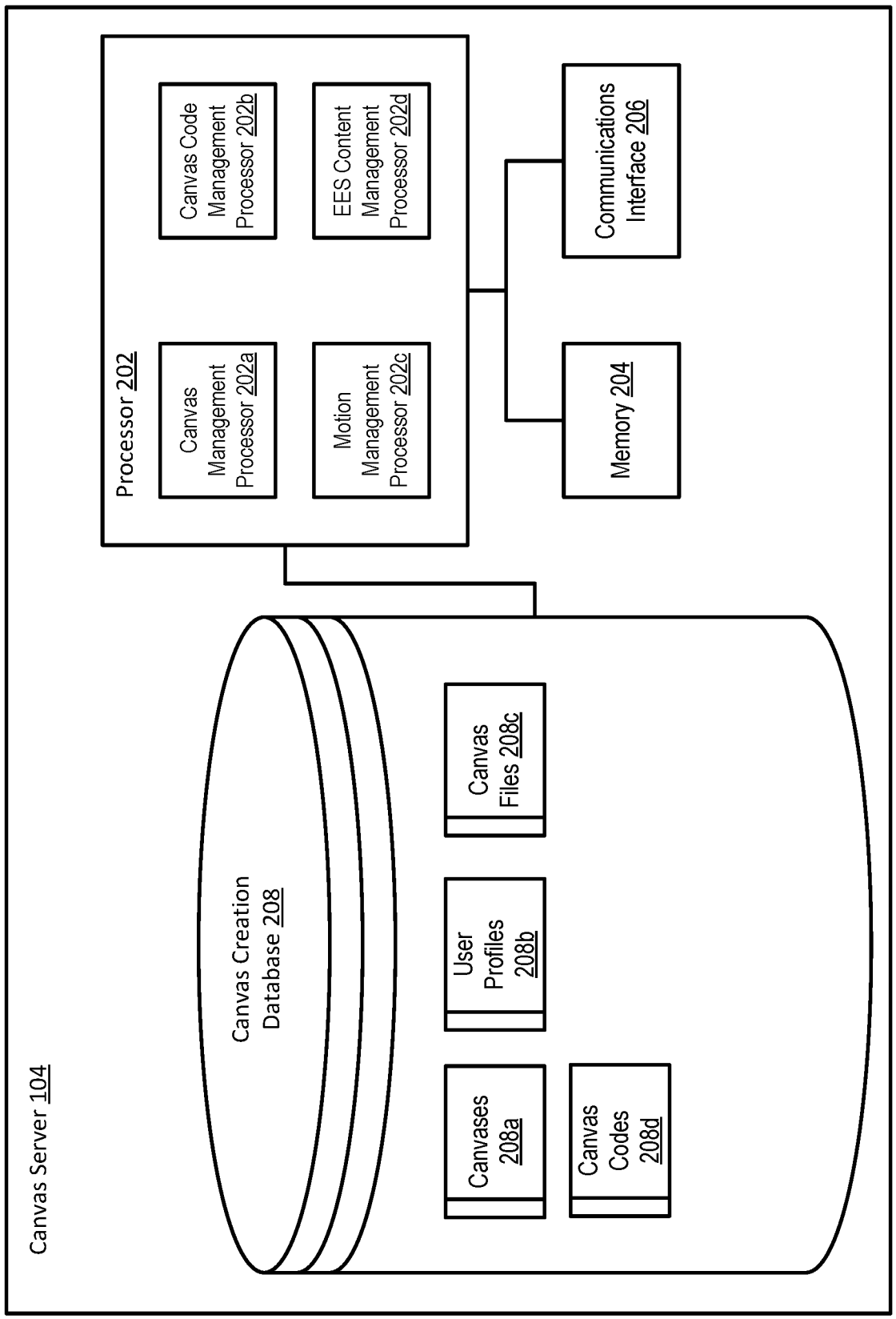
FIG. 2 is a schematic diagram illustrating a canvas server, according to an embodiment.

FIG. 2 is a schematic diagram illustrating a canvas server 104. For example, in some implementations, a canvas server 104 (also referred to herein as a proxy server 104) can include a processor 202, a memory 204, a communications interface 206, and a canvas creation database 208. The canvas server 104 can be a server managed by a network administrator, can be a client device managed by a user, and/or the like.

In some embodiments, the at least one memory 204 can be a hardware module and/or component configured to store data accessible by the at least one processor 202, and/or to store code representing executable instructions for the at least one processor 202. The memory 204 can be, for example, a random access memory (RAM), a memory buffer, a hard drive, a database, an erasable programmable read-only memory (EPROM), an electrically erasable read-only memory (EEPROM), a read-only memory (ROM) and/or so forth. In some embodiments, the memory 204 stores instructions to cause the processor to execute modules, processes and/or functions associated with the canvas server 104.

The at least one processor 202 can be a general purpose processor, a Field Programmable Gate Array (FPGA), an Application Specific Integrated Circuit (ASIC), a Digital Signal Processor (DSP), and/or the like. The at least one processor 202 can implement a number of modules, compute devices, and/or server components, including but not limited to a canvas management processor 202a, a canvas code management processor 202b, a motion management processor 202c, and an EES content management processor 202d. The at least one processor 202 can be configured to execute instructions generated by any of the modules and/or server components, and/or instructions stored in the memory 204. In some implementations, if the canvas server 104 includes multiple processors 202, the modules and/or server components can be distributed among and/or executed by the multiple processors. The at least one memory 204 can be configured to store processor-readable instructions that are accessible and executable by the processor 202.

In some implementations, the modules, compute devices, and/or server components can be implemented on the processor 202 (e.g., as software executed on and/or implemented by the processor). In some implementations, the modules, compute devices, and/or server components can be software stored in the memory 204 and executed by the processor 202. In other implementations, the modules, compute devices, and/or server components can be any assembly and/or set of operatively-coupled electrical components included in, and/or separate from, the processor 202 and the memory, including but not limited to field programmable gate arrays (FPGAs) and/or application-specific integrated circuits (ASICs).

The canvas management processor 202a can be a module, compute device, and/or server component configured to manage the generation, modification, and distribution of canvas data structures. For example, in some implementations, the canvas management processor 202a can receive input from a user, and can use the input to generate a canvas data structure. Based on other information provided by the user, the canvas management processor 202a can also subsequently modify the canvas data structure, or send the canvas data structure to other users. The canvas code management processor 202b can be a module, compute device, and/or server component configured to generate canvas codes for mirroring and/or sharing canvas data structures. For example, the canvas code management processor 202b can generate canvas codes for canvas data structures when a user indicates a desire to share or copy a canvas, and/or when canvas data structures are generated.

The motion management processor 202c can be a module, compute device, and/or server component configured to process client device motion data, to facilitate actions performed at the client device. For example, the motion management processor 202c can receive input from client device components that measure device movement, and can use the input to perform actions within canvas data structures. The EES content management processor 202d can be a module, compute device, and/or server component configured to generate, distribute, and process data from EES data structures. For example, the EES content management processor 202d can receive user input, can generate an EES data structure based on the user input, can render and/or implement the EES data structure, and can process data obtained from the EES.

The communications interface 206 can be an interface configured to facilitate transmission and/or receipt of data to and/or from other devices operatively coupled to the canvas server 104. For example, the communications interface 206 can be operatively coupled to users' client devices, e.g., via a wireless internet connection facilitated by the communications interface 206. The communications interface 206 can send data packets to user client devices, and/or receive data packets from user client devices, over the wireless connection facilitated by the communications interface 206. In other implementations, the communications interface 206 can be a wired internet interface, e.g., such as an Ethernet communications interface, and/or the like.

The canvas creation database 208 can store a number of data structures relating to canvases, users, and/or other information that can be used to modify, render, or send canvas data structures. For example, the canvas creation database 208 can include a canvas table 208a, a user profile table 208b, a canvas file table 208c, a canvas code table 208d, and/or the like. The canvas table 208a can store records of canvas data structures representing user-generated canvases and personal user canvases. Each canvas data structure record in the canvas table 208a can include a canvas record identifier, a user identifier for a user with which the canvas data structure is associated, a list of identifiers of canvas files associated with the canvas data structure, a canvas type (e.g., a public canvas, a private canvas, a personal canvas, and/or the like), a canvas name, a user access list including a list of identifiers associated with users who have access to the canvas data structure, a timestamp of when the canvas data structure was created, and/or similar information. A public canvas can be a canvas that other users can search for and/or access within a canvas application running on client devices of those users. A private canvas can be a canvas that particular users can access (e.g., using a canvas code, and/or based on the user access list within the canvas data structure), and that other users (e.g., users without access to the canvas code, and/or users not included in the user access list) cannot access. A personal canvas can be a canvas that only the user with which the personal canvas is associated can access (for example, a first user can access that user's personal canvas, while other users cannot access that user's personal canvas).

The user profile table 208b can include records of users creating and/or viewing canvases. For example, a user data structure in a user profile record of the user profile table 208b can include a user profile identifier, a user email address, a user password, a user name, a user profile visibility (e.g., public or private), authentification information for the user, a timestamp of when the user created a profile, and/or similar profile information. The canvas file table 208c includes records of file data structures (such as documents, images, EES, and/or other files) that can be displayed and/or otherwise included in a canvas. For example, each file data structure represented in the canvas file records in the canvas file table 208c can include a file record identifier, a canvas identifier and/or a list of canvas identifiers, associated with the canvas and/or set of canvases with which the file is associated, a file name, a file type (e.g., a text document, a photograph, an EES file, a video, and/or similar file types), a file size, an aspect ratio of the file (if applicable), a location of the file (e.g., a directory at which the file is stored), a thumbnail image for the file (e.g., to be displayed in the canvas), a local filepath for the file (e.g., a filepath at a client device of the user associated with the file, at which the file is stored), an identifier of a user associated with the file, a date at which the file was created or stored in the canvas creation database, and/or similar information.

The canvas code table 208d can be a table storing representations of codes that can be scanned by users to view and/or perform other actions with a canvas data structure. For example, a record in the canvas code table 208d can include a canvas code identifier, an identifier of a canvas code with which the canvas code is associated, a canvas code type (e.g., a QR code, a bar code, and/or a similar code type), a canvas code instruction type (e.g., no instruction, an instruction to copy a canvas, an instruction to share a canvas, and/or the like), a date at which the canvas code was generated, a list of identifiers associated with users that are authorized to scan the canvas code, and/or similar information.

Figure 3:
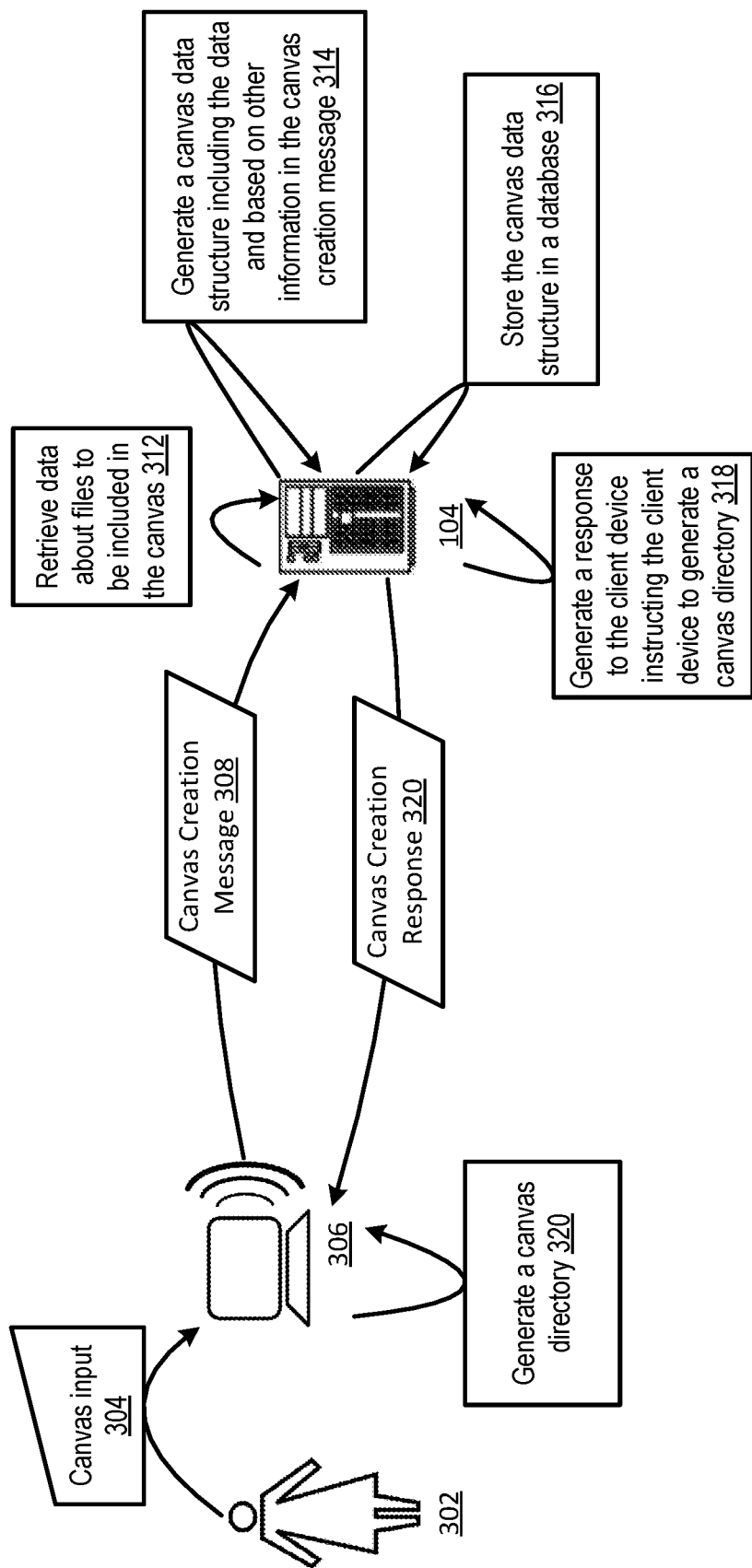
FIG. 3 is a diagram illustrating generating a canvas, according to an embodiment.

FIG. 3 is a diagram illustrating generating a canvas. For example, in some implementations, a user 302 can access a canvas application on a client device 306 associated with the user 302. The client device 306 can be configured to instantiate the canvas application, such that the user 302 can generate, display, and/or share canvases via the canvas application. For example, the client device 306 can be a personal computer, a mobile device (e.g., such as a smart-phone, a tablet, a personal digital assistant device, and/or a similar device), and/or a similar electronic device. The user 302 can use the canvas application instantiated on the client device 306 to generate canvas data structures. For example, the user 302 can provide canvas input 304 to the canvas application instantiated on the client device 306. The canvas input 304 can include information that the canvas application can use to generate a canvas, such as a name for the canvas, a file directory for the canvas, a canvas type, and/or other information. The client device 306 (using the canvas application) can send the canvas input 304 to the canvas server 104, e.g., via a canvas creation message 308 that includes the canvas input 304, a user identifier associated with the user 302, and/or other information for generating the canvas.

The canvas server 104 can retrieve, at 312, data about files to be included in the canvas. For example, in some implementations, the canvas server 104 can retrieve the files to be included in the canvas, and can store them in the canvas creation database 208. The canvas server 104 can then generate, at 314, a canvas data structure that includes data relating to the files (e.g., file identifiers, file thumbnails, and/or the like), as well as other data included in the canvas creation message 308, such as a name and type of the canvas. In other implementations, the canvas server 104 can request information about files to be included in the canvas from the client device 306 (e.g., can request metadata including the file names, the file directory, and/or other information), and can generate file data structures based on the metadata. The canvas server 104 can store the file data structures in the canvas creation database 208, and can then generate, at 314, the canvas data structure, including the identifiers of the file data structures and the information included in the canvas creation message 308. In other implementations, the canvas input 304 can include a list of files to be associated with the canvas data structure. The files may already be stored at the canvas server 104 (e.g., the canvas input 304 can include file data structure identifiers associated with file data structures stored at the canvas server 104). The canvas server 104 can generate, at 314, the canvas data structure, including the information included in the canvas creation message 308 (such as the the identifiers of the file data structures and other canvas information). The canvas data structure can be stored, at 316, in the canvas creation database 208.

The canvas server 104 can, at 318, generate a response to the client device 306 that instructs the client device 306 to create a canvas directory for the canvas data structure. The canvas directory can be a file directory of the client device 306, to which a user 302 can store files to be associated with the canvas. For example, the user 302 can specify a file directory for the canvas, on the client device 306 (e.g., as part of the canvas input 304). Once the canvas data structure has been generated, the canvas server 104 can send a canvas creation response 320 to the client device 306, and the client device 306 can specify, at 320 and at the client device 306, a file directory (i.e., a canvas directory) for storing files associated with the canvas. The user 302 can subsequently copy and/or otherwise save files in that canvas directory. The canvas application on the client device 306 can periodically (e.g., over predetermined intervals of time) determine whether new files have been added to the canvas directory. If new files have been added to the canvas directory, the client device 306 can send a message to the canvas server 104 to inform the canvas server 104 that additional files can be added to the canvas data structure. For example, the client device 306 (via the canvas application) can send copies of the files to the canvas server 104, and/or can send metadata associated with the files to the canvas server 104. The canvas server 104 can generate new file data structures for the new files, and can associate the new file data structures with a canvas associated with the canvas directory with which the file data structures are associated. In this manner, the canvas data structure can be updated to include new files when the user 302 stores new files in the specified canvas directory. The canvas server 104 can similarly remove files from canvas data structures and/or perform other actions with files associated with the canvas data structures, based on changes to the files in the canvas directory.

Figure 4:
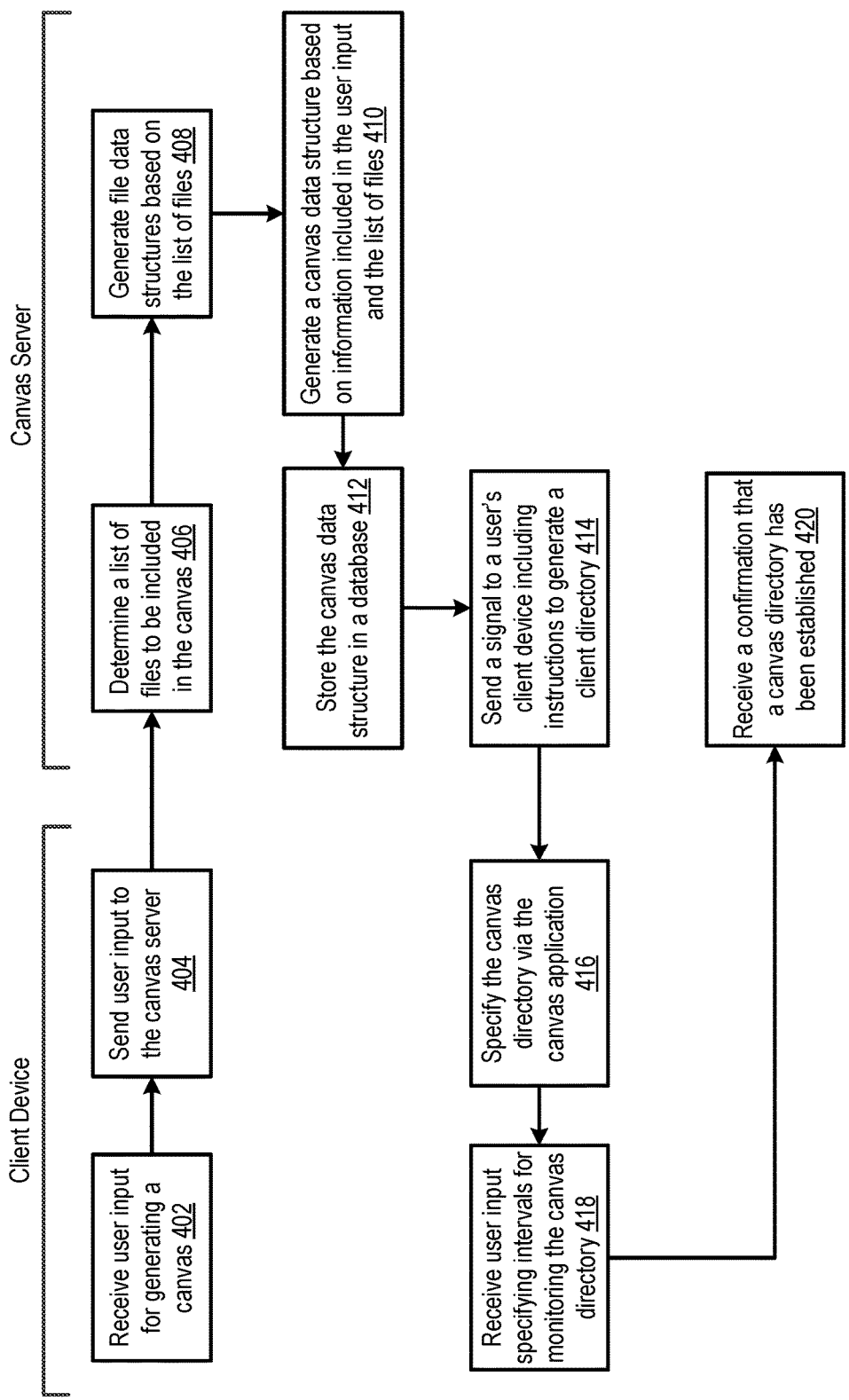
FIG. 4 is a logic flow diagram illustrating generating a canvas, according to an embodiment.

FIG. 4 is a logic flow diagram illustrating generating a canvas. For example, in some implementations, the client device 306 can receive, at 402, receive user input for generating a canvas. For example, the user input can include a canvas name, a canvas type, and/or other information for generating a canvas data structure. The client device 306 can, at 404, send the user input to the canvas server 104. The canvas server 104 (e.g., via canvas management processor 202*a*) can receive the user input and can, at 406, determine a list of files to be included in the canvas. For example, the canvas management processor 202*a* can request file data structures from the client device 306, or can request file metadata from the client device 306. The canvas management processor 202*a* can generate, at 408, file data structures based on the files and/or metadata received from the client device 306. Alternatively, the canvas management processor 202*a* can determine a list of identifiers of file data structures stored in the canvas creation database 208, that are included in the user input. Instead of generating file data structures, the canvas management processor 202*a* can retrieve the file data structures associated with the identifiers from the canvas creation database 208.

The canvas management processor 202*a* can, at 410, generate a canvas data structure based on the information included in the user input received from the client device 306, and based on the file data structures generated and/or retrieved at 408. For example, the canvas data structure can store identifiers associated with the file data structures in a new canvas data structure, as well as other data the user specifies (such as a name for the canvas, a canvas type, and/or other information). The canvas management processor 202*a* can, at 412, store the canvas data structure in the canvas creation database 208.

The canvas management processor 202*a* can also, at 414, send a signal to a user's client device 306 that includes instructions to generate a client directory at that client device 306. For example, the canvas management processor 202*a* can send a signal including a filepath included in the metadata of a file, and/or stored in the file data structure. The client data structure can receive the signal, and can, at 416, specify the canvas directory, via the canvas application. Specifically, the canvas application can store, at the client device 306, an indication that a canvas associated with the user will be tied to a canvas directory corresponding to the filepath of the file data structure. The canvas application can also prompt the user to specify settings relating to the canvas directory (e.g., intervals over which the canvas directory should be monitored, and/or the like). When the canvas application instantiated on the client device 306 receives, at 418, user input specifying these settings, the client device 306 can store the settings, and can send a signal to the canvas management processor 202*a*, confirming that the canvas directory has been established at the client device 306. In some implementations, the signal may include the canvas directory settings. In some implementations, when the canvas management processor 202*a*, at 420, receives the signal confirming that the canvas directory has been established, the canvas management processor 202*a* can store the canvas directory settings in the canvas creation database 208, if the canvas directory settings are included in the signal.

Figure 5:
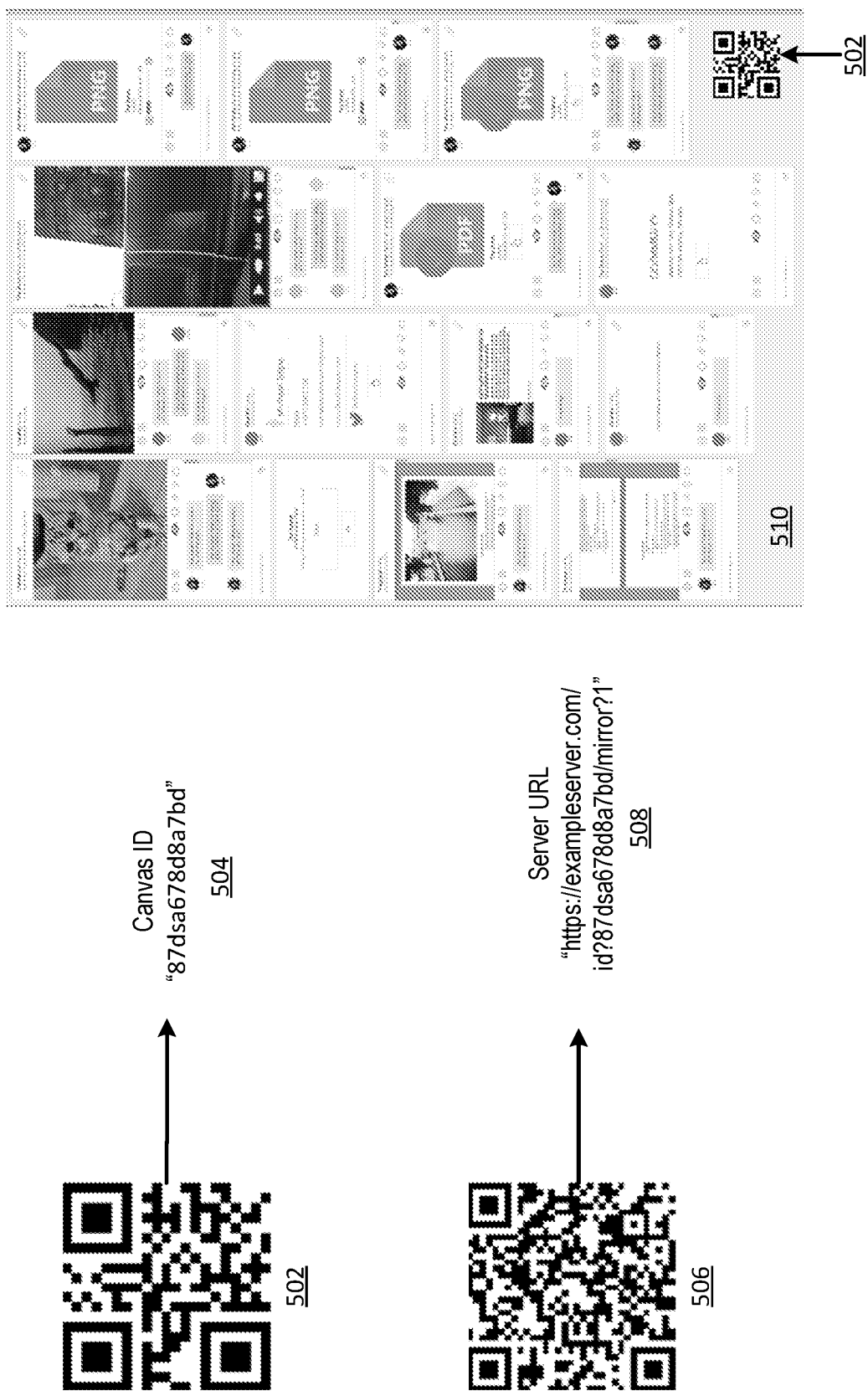
FIG. 5 is a diagram illustrating canvas codes, according to an embodiment.

FIG. 5 is a diagram illustrating canvas codes. For example, in some implementations, the canvas server 104 (e.g., via canvas code management processor 202*b*) can generate canvas codes 502 and/or 506 that allow users to access and/or manipulate canvas data structures. For example, a canvas identification code 502 can be generated by the canvas code management processor 202*b*, and can be displayed within a user canvas 510. When other users scan the canvas identification code 502 via a client device 306 instantiating a canvas application, the canvas application can extract data 504 from the canvas identification code 502 (e.g., such as a canvas identifier). The canvas application can use the canvas identifier and/or other data to request a canvas data structure corresponding to the canvas identification code 502, from the canvas server 104. As an example, if a user generates a canvas 510, the canvas code management processor 202*b* can generate a canvas identification code 502 that can be displayed within each instance of that canvas 510. If another user sees the canvas 510 (e.g., on a client device of the user associated with the canvas, on a television, and/or the like), that user can use their own client device 306 to scan the canvas identification code 502. A canvas application instantiated on that user's client device 306 can use the canvas identification code 502 to obtain an instance of the canvas 510 (i.e., to retrieve a copy of the canvas data structure of that canvas 510), such that the user can view the canvas 510 on her own client device 306. In this manner, users can share instances of their canvases with other users using other client devices.

In some implementations, a canvas mirror code 506 can be generated by the canvas code management processor 202*b* when a user would like to mirror (e.g., copy) a first canvas within a second canvas. For example, an owner of a personal canvas can choose to copy files within personal canvas, to a public canvas accessible by other users. As another example, a user accessing another user's public canvas can choose to copy the files in the public canvas to their own personal canvas. The canvas mirror code 506 can include a server link and/or uniform resource locator (URL) including a canvas identifier for the first canvas and an instruction to the server to mirror the first canvas. When a user scans the canvas mirror code 506, the canvas application on that user's client device 306 can use the server URL to request that files associated with the canvas are copied to a canvas associated with, and specified by, that user. As one example, a first user can send a canvas mirror code 506 to a second user, such that the second user can copy a public canvas owned by the first user, into the personal canvas of the second user. When the second user receives the canvas mirror code 506, the second user can scan the canvas mirror code 506 using their client device 306, and can also specify that the second user would like to copy the canvas identified in the canvas mirror code 506 to the second user's personal canvas (e.g., via a user interface of the canvas application). The canvas application on the second user's client device 306 can then request that the canvas server copy some or all of the files associated with the canvas of the first user, into the canvas specified by the second user, using the instruction included in the server URL in the canvas mirror code 506. The canvas server can then modify the canvas of the second user to include the files from the canvas of the first user, based on the instruction in the canvas mirror code 506. As another example, a user can send herself a canvas mirror code 506 for a first canvas, and can scan the canvas mirror code 506 and specify a different canvas associated with that user. The canvas application on that user's client device 306 can then copy some or each of the files associated with the first canvas into the different canvas specified by the user. In this manner, users can share files included in their canvases, in addition to sharing canvases themselves. In some implementations, other canvas codes can be generated to perform other actions, such as downloading specific canvas files, and/or the like.

In some implementations, a canvas code can also be a canvas delivery code. The canvas delivery code can include a canvas identifier for the first canvas, as well as a temporary authentication token (e.g., alphanumerical code that expires within a predetermined period of time and that can be used to authenticate a user). When a user scans the canvas delivery code, the canvas application can send the canvas identifier and the temporary authentication token to the canvas server 104 so as to authenticate the user before allowing the user to access the canvas (e.g., using the temporary authentication token). The canvas delivery code can then otherwise be utilized similar to canvas identification code 502.

Figure 6:
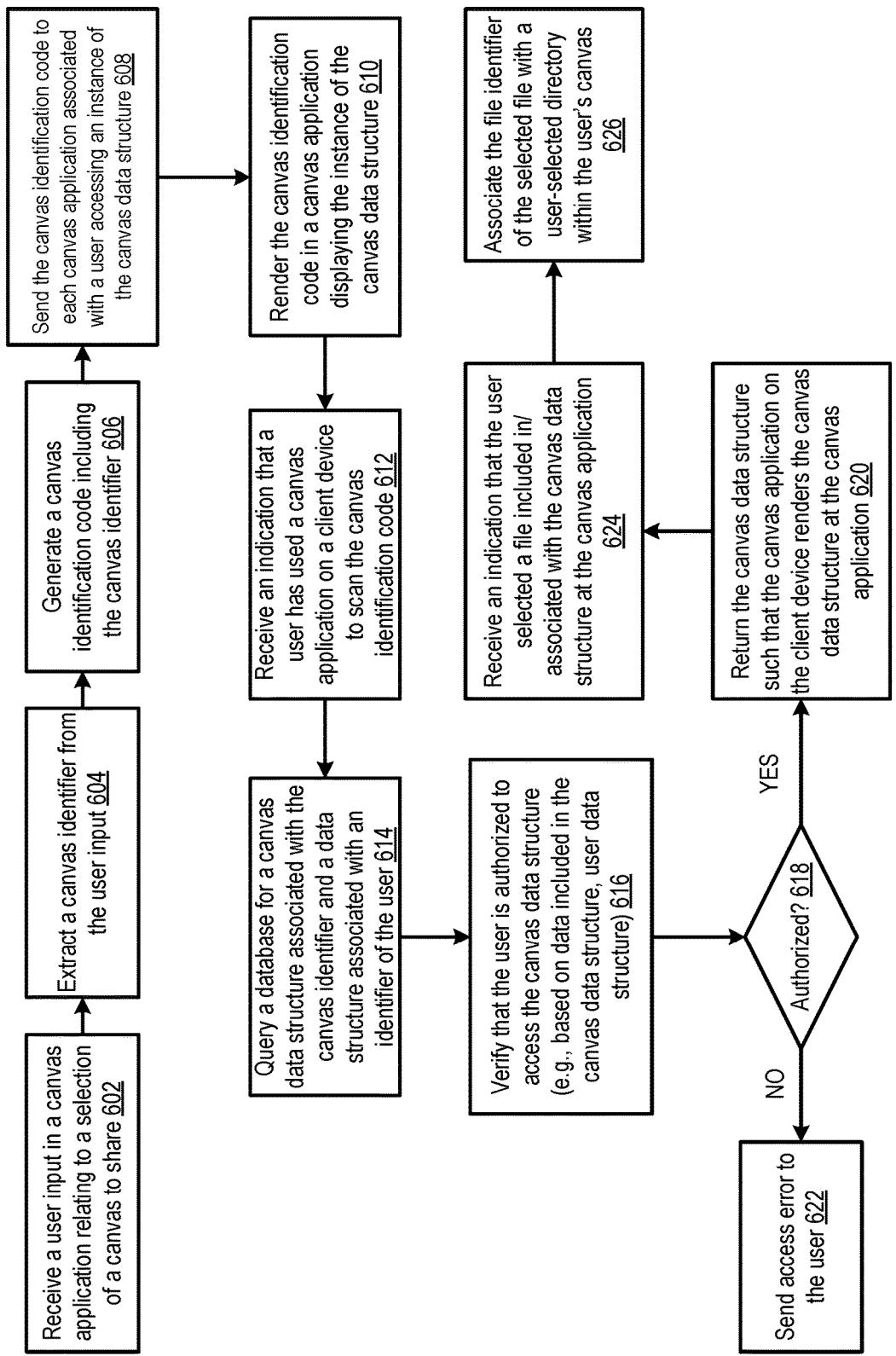
FIG. 6 is a logic flow diagram illustrating sharing a canvas using canvas codes, according to an embodiment.

FIG. 6 is a logic flow diagram illustrating sharing a canvas using canvas codes. For example, in some implementations, the canvas server 104 (e.g., using canvas code management processor 202b) can, at 602, receive user input indicating that the user selected a canvas to share. The canvas code management processor 202b can, at 604, extract a canvas identifier of the canvas to be shared, from the user input. The canvas code management processor 202b can, at 606, generate a canvas identification code that includes the extracted canvas identifier. The canvas code management processor 202b can, at 608, send the canvas identification code to each canvas application associated with a user accessing an instance of the canvas data structure, such that, at 610, the canvas application can render the canvas identification code in a user interface of the canvas application that displays the instance of the canvas data structure. Said another way, the canvas code management processor 202b can send the canvas identification code to the client device 306 of each user running a canvas application that is accessing and/or displaying the canvas associated with the canvas identifier in the canvas identification code. The canvas application instantiated on each client device 306 can then display the canvas identification code within that canvas.

In alternative implementations, instead of receiving an indication that the user selected a canvas to share and generating a canvas identification code as a result (e.g., at 602-606), the canvas code management processor 202b can automatically generate, at 602, a canvas identification code for each canvas data structure, e.g., when the canvas data structure is first generated at the canvas server. The canvas code management processor 202b can associate the canvas identification code with the canvas data structure (e.g., by storing the canvas identification code itself within the canvas data structure, and/or by storing an identifier for the canvas identification code in the canvas data structure), such that each time a copy of the canvas data structure is provided to a canvas application instantiated on a user client device 306, the canvas that is rendered using the canvas data structure also includes the canvas identification code. The canvas code management processor 202b can then send the canvas identification code, e.g., as in 608 such that it can be rendered within each instance of the canvas associated with the canvas identification code.

In some implementations, at 612, the canvas code management processor 202b can receive an indication that a user has scanned the canvas identification code, e.g., using a client device 306 running a canvas application. For example, the canvas code management processor 202b can receive a signal including the canvas identifier and a user identifier associated with the user, with a request to retrieve the canvas data structure. The canvas code management processor 202b can query, at 614, the canvas creation database 202 to retrieve a canvas data structure associated with the canvas identifier in the signal, and can also retrieve a user profile data structure associated with the user identifier in the signal. The canvas code management processor 202b can, at 616, verify that the user is authorized to access that canvas data structure (e.g., by determining whether or not the canvas is public, private, or personal, by determining whether or not the user identifier is included in a whitelist stored in the canvas data structure, by determining whether or not the user profile data structure includes a public key, certificate, and/or other mechanism for authenticating the user for that canvas data structure, and/or the like). If, at 618, the canvas code management processor 202b determines that the user is authorized to access the canvas data structure, canvas code management processor 202b can, at 620, return a copy of the canvas data structure to the canvas application at the client device 306, such that the canvas application can render the canvas within a user interface of the canvas application. If, however, at 618, the canvas code management processor 202b determines that the user is not authorized to access the canvas data structure, canvas code management processor 202b can, at 622, send an access error to the user, indicating that the user is not authorized to access the canvas.

If the user wishes to copy a file from the accessed canvas, the user can select the file, and select a directory of one of the user's canvases in which to move and/or copy the file. Specifically, the canvas code management processor 202b can receive, at 624, an indication that the user has selected a file associated with the canvas data structure being accessed by the user. For example, within a canvas application and/or similar user interface displaying the canvas data structure, the user can select an icon representing a file that is displayed within the canvas data structure. The canvas code management processor 202b can then, at 626, associate a file identifier associated with the selected file, with a directory within one or more of the user's canvases. For example, the user can, when selecting a file, indicate a directory of a canvas in which the user would like to copy the file. The canvas code management processor 202b can then associate the file with the indicated directory, such that the user can access the file within that directory of the user's canvas. In some implementations, rather than associating the file's identifier with the user's canvas, the canvas code management processor 202b can generate a second instance of the file that is a copy of the file, can associate the copy of the file with the specified directory, and can store the copy of the file in the canvas creation database 202. In this manner, the user can copy particular files from the accessed canvas to the user's canvases.

Figure 7A:
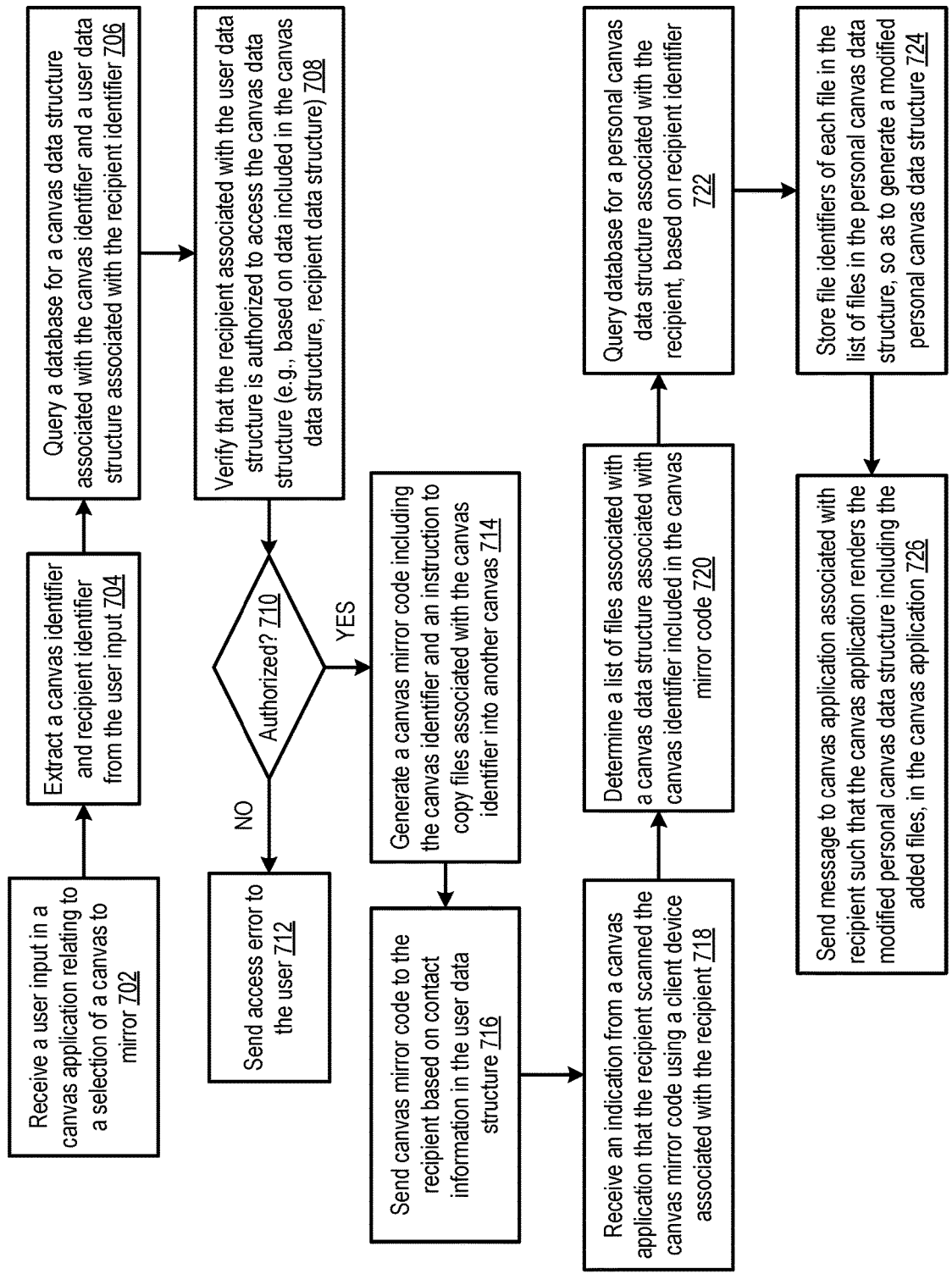
FIG. 7A is a logic flow diagram illustrating mirroring a canvas using canvas codes, according to an embodiment.

FIG. 7A is a logic flow diagram illustrating mirroring a canvas using canvas codes. For example, in some implementations, the canvas server 104 (e.g., using canvas code management processor 202b) can, at 702, receive user input indicating that the user selected a first canvas to mirror (i.e., to copy into a second canvas). The canvas code management processor 202b can, at 704, extract both a canvas identifier and a recipient identifier from the user input, where the canvas identifier is associated with the first canvas, and the recipient identifier is associated with the user associated with the second canvas. The canvas code management processor 202b can, at 706, query the canvas creation database 202 to retrieve a canvas data structure associated with the canvas identifier, and to retrieve a user profile data structure associated with the recipient identifier. The canvas code management processor 202b can, at 708, verify that the recipient associated with the user profile data structure is authorized to access the canvas data structure, e.g., in a manner similar to the process at 616 in FIG. 6. If, at 710, the canvas code management processor 202b determines that the user is not authorized to access the canvas data structure, canvas code management processor 202b can, at 712, send an access error signal to the client device 306 associated with the recipient. If, at 710, the canvas code management processor 202b determines that the user is authorized to access the canvas data structure, canvas code management processor 202b can, at 714, generate a canvas mirror code including a server URL including both the canvas identifier, and an instruction to copy files associated with the canvas identifier, into another canvas. The canvas code management processor 202b can, at 716, send the canvas mirror code to the intended recipient, e.g., based on contact information (such as an email address and/or user identifier) included in the user profile data strutcure.

The canvas code management processor 202b can, at 718, receive an indication from the canvas application that the recipient scanned the canvas mirror code using a client device 306 associated with the recipient. The indication can be a signal that includes a canvas identifier of the first canvas, a user profile identifier of the recipient (also referred to herein as a recipient identifier), and/or other information. The canvas code management processor 202b can, at 720, determine a list of files associated with a canvas data structure that is associated with the canvas identifier in the signal, and can, at 722, query the canvas creation database 202 for a personal canvas data structure associated with the recipient, based on the recipient identifier. The canvas code management processor 202b can, at 724, store file identifiers of each file in the list of files, in the personal canvas data structure, so as to generate an updated and/or modified personal canvas data structure for the recipient. In other implementations, the canvas code management processor 202b can generate duplicate copies of the files, and can store the identifiers of the duplicate files within the personal canvas data structure (e.g., instead of storing the identifiers of the existing files). The canvas code management processor 202b can, at 726, send a message (e.g., including the personal canvas data structure) to the canvas application instantiated on the recipient's client device 306 indicating that the canvas has been mirrored, such that the canvas application can render the modified personal canvas data structure that includes the added files, within a user interface of the canvas application.

Figure 7B:
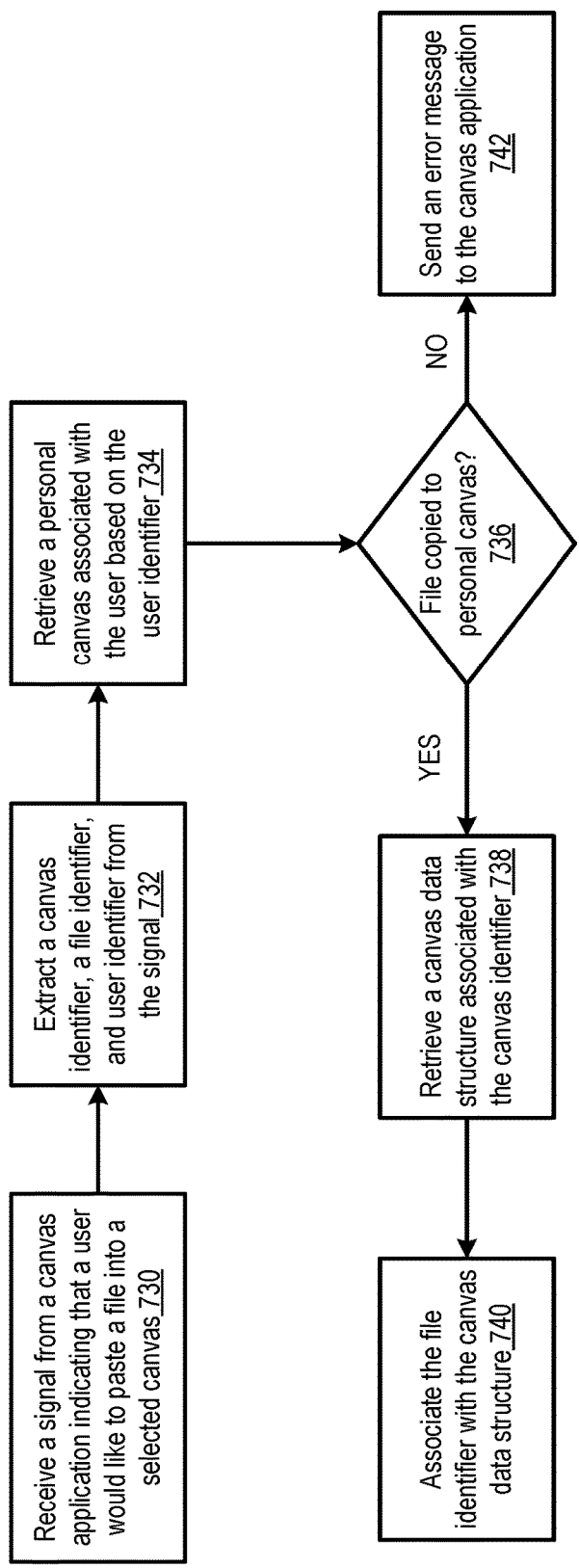
FIG. 7B is a logic flow diagram illustrating copying a file to a canvas, according to an embodiment.

In some implementations, the user can also select specific files to copy to their personal canvas. For example, in some implementations, each file may include a barcode and/or similar code that can be scanned, such that the file is copied to the user's personal canvas in a manner similar to how the canvas code management processor 202b copies files from one canvas to another when mirroring that canvas. In this manner, the personal canvas can serve as a clipboard for a user, where the user can copy a file associated with a first canvas and store the information within the personal canvas. Referring to FIG. 7B, the user can also "paste" the file into another canvas (e.g., can copy and/or move the file to another canvas). For example, in some implementations, the user can, after copying the file to their personal canvas, select a representation of another canvas in the canvas application and select a "paste" option within that representation of the other canvas. When the user selects the "paste" option in the other canvas, the canvas code management processor 202b can, at 730, receive a signal from the canvas application indicating the selection of the other canvas for pasting, and can, at 732, retrieve various identifiers included in the signal (e.g., including an identifier of the other canvas, an identifier for the file being copied, and a user identifier). The canvas code management processor 202b can, at 734, use the user identifier to retrieve a personal canvas associated with the user (e.g., by querying the canvas creation database 202 for a personal canvas data structure associated with the user using the user identifier). The canvas code management processor 202b can, at 736, check to ensure that the file identifier is still and/or actually associated with the personal canvas, e.g., by searching for the file identifier within a list of file identifiers stored in the personal canvas data structure. If the file identifier is associated with the personal canvas, the canvas code management processor 202b can, at 738, retrieve a data structure associated with the other canvas identifier and can, at 740, associate the file with that canvas (e.g., by including the file identifier in a list of file identifiers stored in the canvas data structure that are included in the canvas defined by the canvas data structure). If the file is not associated with the personal canvas, the canvas code management processor 202b can, at 742, send a signal to the canvas application indicating that the file is not associated with the user's personal canvas (or, said another way, that the user has not yet copied the file to their personal canvas). When the file has been copied to the other canvas (e.g., "pasted" to the other canvas), the canvas code management processor 202b can optionally delete the file from the user's personal canvas (e.g., can remove the file identifier from the list of file identifiers stored in the personal canvas data structure).

In some implementations, the canvas code management processor 202b may not receive a file identifier from the canvas application, and can instead determine a file identifier associated with a file that was most recently added to the user's personal canvas, and can copy that file to the other canvas (e.g., can store that file's file identifier in the canvas data structure). In some implementations, a user can copy a file from one canvas and paste the file into another canvas, without first copying the file to the user's personal canvas. In such implementations, the canvas code management processor 202b may not check to determine whether a particular file identifier is stored in the personal canvas data structure. In some implementations, rather than pasting a file into a canvas, the user can copy the file from the first canvas, and can select (e.g., from a file explorer menu, and/or the like) a directory on the user's machine to which to copy the file. As a non-limiting example, a user can scan a code for a file in a first canvas, and can choose to copy that file to the user's desktop on the user's client device, and/or to a similar directory. In some implementations, rather than receiving a canvas code via email, or scanning a code for a file within a canvas, a user can have access to a canvas code and/or similar code through additional interfaces and/or locations. For example, a user could scan a canvas code on a physical advertisement (such as a poster and/or the like); in such implementations, the canvas code can include similar data as described in the discussion of FIG. 5 (e.g., such as canvas code 508), which can identify a canvas with which the canvas code is associated, an action to be performed with the canvas, and/or the like. The canvas server 104 can then continue to process the canvas code and associated canvas as described in the discussion of FIGS. 6-7B. As another example, a user can be provided a code for a file associated with software and/or a similar product a user has purchased. The user can then scan the code and access the file in a manner similar to that described in the discussion of of FIGS. 6-7B.

Returning to FIG. 7A, in an alternative implementation, instead of receiving, at 718, a canvas identifier and a recipient identifier, the canvas code management processor 202b can receive a first canvas identifier associated with a canvas to be mirrored, and a second canvas identifier associated with a canvas to which files in the first canvas will be copied. In such implementations, instead of querying the canvas creation database 202 for a personal canvas of the recipient at 722, the canvas code management processor 202b can query the canvas creation database 202 for a canvas associated with the second canvas identifier. The canvas code management processor 202b can then store, at 724, the file identifiers in the canvas associated with the second canvas identifier. In this manner, users can either mirror a canvas to their personal canvas by default, and/or can specify a specific canvas to which to mirror a particular canvas.

Figure 8:
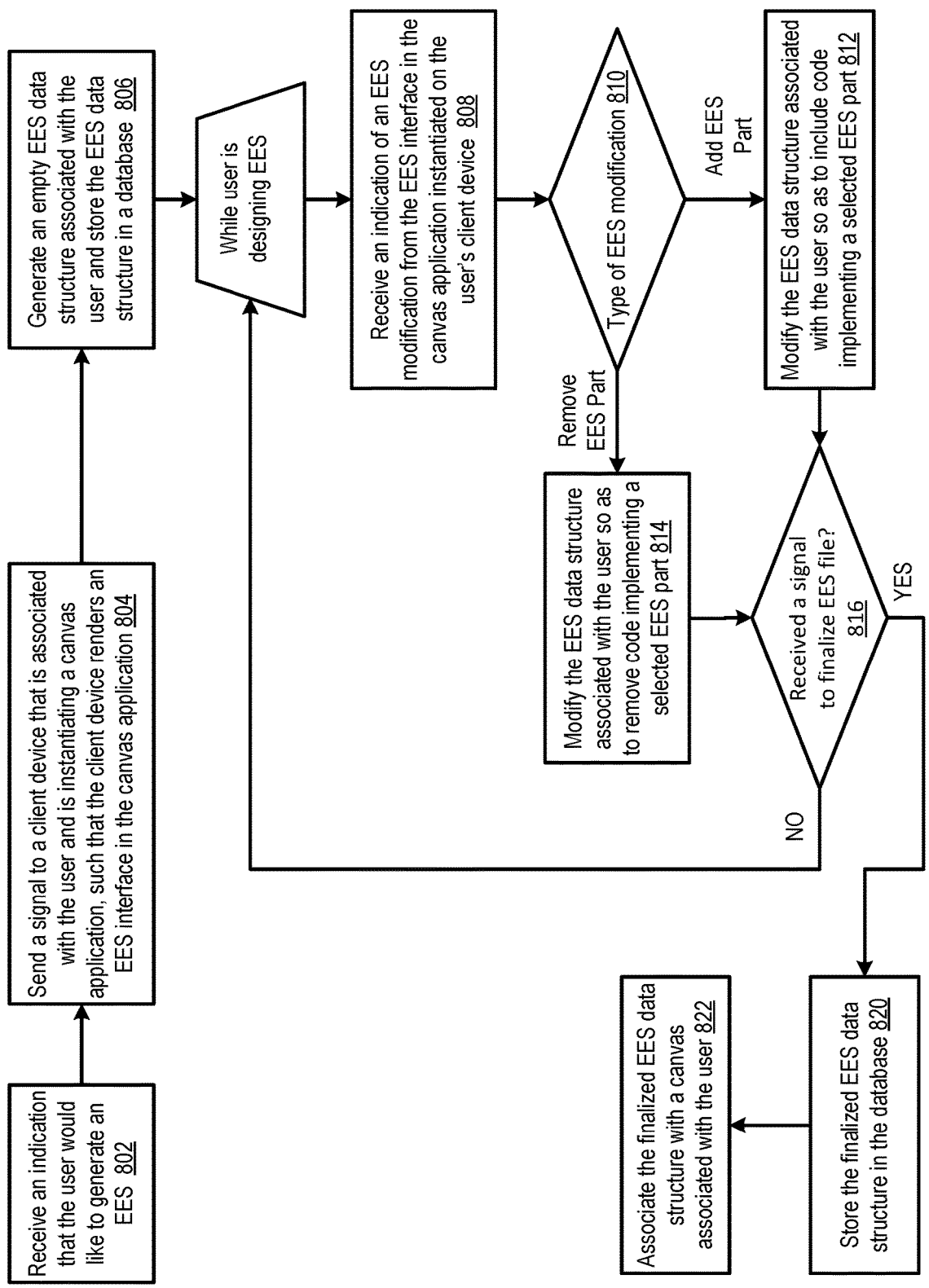
FIG. 8 is a logic flow diagram illustrating generating a live interactive application, according to an embodiment.

FIG. 8 is a logic flow diagram illustrating generating a live interactive application (i.e., an EES). For example, in some implementations, the canvas server 104 (e.g., via the EES content management processor 202d) can receive, at 802, an indication that the user would like to generate an EES. In some implementations, the EES can be an application that can be included and/or shared in canvases. As one non-limiting example, an EES can be a form and/or survey that can be shared via sharing a canvas, and that can display the results of users filling out the form and/or survey substantially in real-time. As another non-limiting example, an EES can be a note-taking application that can include mechanisms to allow a user to provide text for a note, to include checkmarks and/or checkboxes next to particular tasks, and/or the like. As another non-limiting example, an EES can be a messaging application, an email application, an e-invitation application, and/or a similar application through which users can communicate with other users (e.g., other users subscribed to the user's canvas, or to persons who do not have user accounts in the canvas creation database 202). Said another way, an EES can be a user-defined application that can be displayed within a canvas, and/or can be shared through the canvas interface. For example, a user can define code and/or similar specifications for an EES, which can be stored as an EES data structure in the canvas creation database 202. The EES can then be displayed within a canvas as an interactive application, and/or can be shared with other users via sharing the user's canvas, and can be updated substantially in real-time by the user. In this manner, the EES can serve as an efficient manner to share and/or update applications between users (e.g., by allowing users to share and/or update underlying code within the EES, such that the canvas server 104 dynamically updates the rendering and/or functionality of the EES within a canvas based on the user's updates).

The EES content management processor 202d can receive an indication that the user has selected and/or clicked a button to access an EES design interface in the canvas application instantiated at a client device associated with the user. The EES design interface can be an interface in which a user can define an EES data structure that defines an EES application. The EES content management processor 202d can, at 804, send a signal to the client device so as to instruct the canvas application at the client device to render the EES design interface within the canvas application. The EES content management processor 202d can, at 806, also generate an empty and/or null EES data structure, and can associate the EES data structure with the user by storing a user account identifier associated with the user within the EES data structure. The EES content management processor 202d can also store the EES data structure in the canvas creation database 202. The EES data structure can store code and/or other information that can be used to instantiate the EES application in a canvas.

While the user is designing the EES, the EES content management processor 202d can receive substantially real-time updates of the EES being designed by the user. For example, in some implementations, the EES design interface can be a drag-and-drop interface, where the user can select icons representing EES parts (e.g., functionality blocks) and can drag those icons into an EES workspace. The user can also select behaviors associated with each EES part. In some implementations, for example, button EES parts can be associated with an action to send a signal to the canvas server 104 so as to initiate a particular server-side action (including but not limited to storing input from a text box EES part, sending data to other users, and/or the like). Alternatively, the user could specify that a button EES part causes the canvas application to send an email to another user including a file indicated in another EES part within the EES. These user-specified actions can be referred to as "behaviors." Users can select from pre-implemented behaviors for each EES part, and/or can define code that implements additional behaviors for EES parts. In some implementations, users can also define additional code to define additional EES parts other than those provided within the EES design interface of the canvas application. In some implementations, the EES content management processor 202d can receive the user's selections and definitions substantially in real-time, and can update the EES data structure stored at the canvas creation database 202 such that the user can preview the EES that she is generating within the EES design interface substantially in real-time.

Specifically, the EES content management processor 202d can receive, at 808, an indication of an EES modification from the EES design interface on the user's client device. For example, the modification can include the user dragging an icon representing an EES part into a workspace of the EES design interface (i.e., adding EES functionality to the EES), removing an icon representing an EES part from the workspace (i.e., removing EES functionality from the EES), adding, removing, and/or modifying behaviors associated with EES parts within the workspace, and/or similar modifications. The EES content management processor 202d can, at 810, determine the type of modification made by the user, and to process the EES modification accordingly. For example, if the EES modification is an addition of an EES part to the EES, the EES content management processor 202d can, at 812, modify the stored EES data structure associated with the EES being defined by the user in the workspace to include code and/or to be associated with functionality that implements an EES part selected by the user. If the EES modification is a removal of an EES part from the EES, the EES content management processor 202d can instead, at 814, modify the EES data structure to remove code and/or to otherwise remove an association of the EES to functionality that implements that removed EES part selected by the user. The EES content management processor 202d can, at 816 and after modifying the EES in response to receiving the modification, determine if the user's client device has sent a signal to the user to finalize the EES data structure. For example, the user can select an option to finalize the EES and/or to submit the EES parts that the user has constructed in her workspace. The user's client device can then send a signal to the EES content management processor 202d, e.g., including indications of the EES parts in the user's workspace, identifying information for the EES data structure (e.g., a name and/or description provided for the EES), and an indication that the user has finished modifying the EES data structure. If the EES content management processor 202d has received an indication that the user has finalized the EES data structure, the EES content management processor 202d can, at 820, store the finalized EES data structure in the canvas creation database 202, and can, at 822, associate the finalized EES data structure with a canvas associated with the user. The canvas can be determined based on a selection provided by the user when the user indicates that she has finished modifying the EES data structure. If the EES content management processor 202d does not receive a signal to finalize the EES data structure, the EES content management processor 202d can continue to monitor for additional EES modifications, and can continue to modify the EES data structure in the canvas creation database 202.

Figure 9:
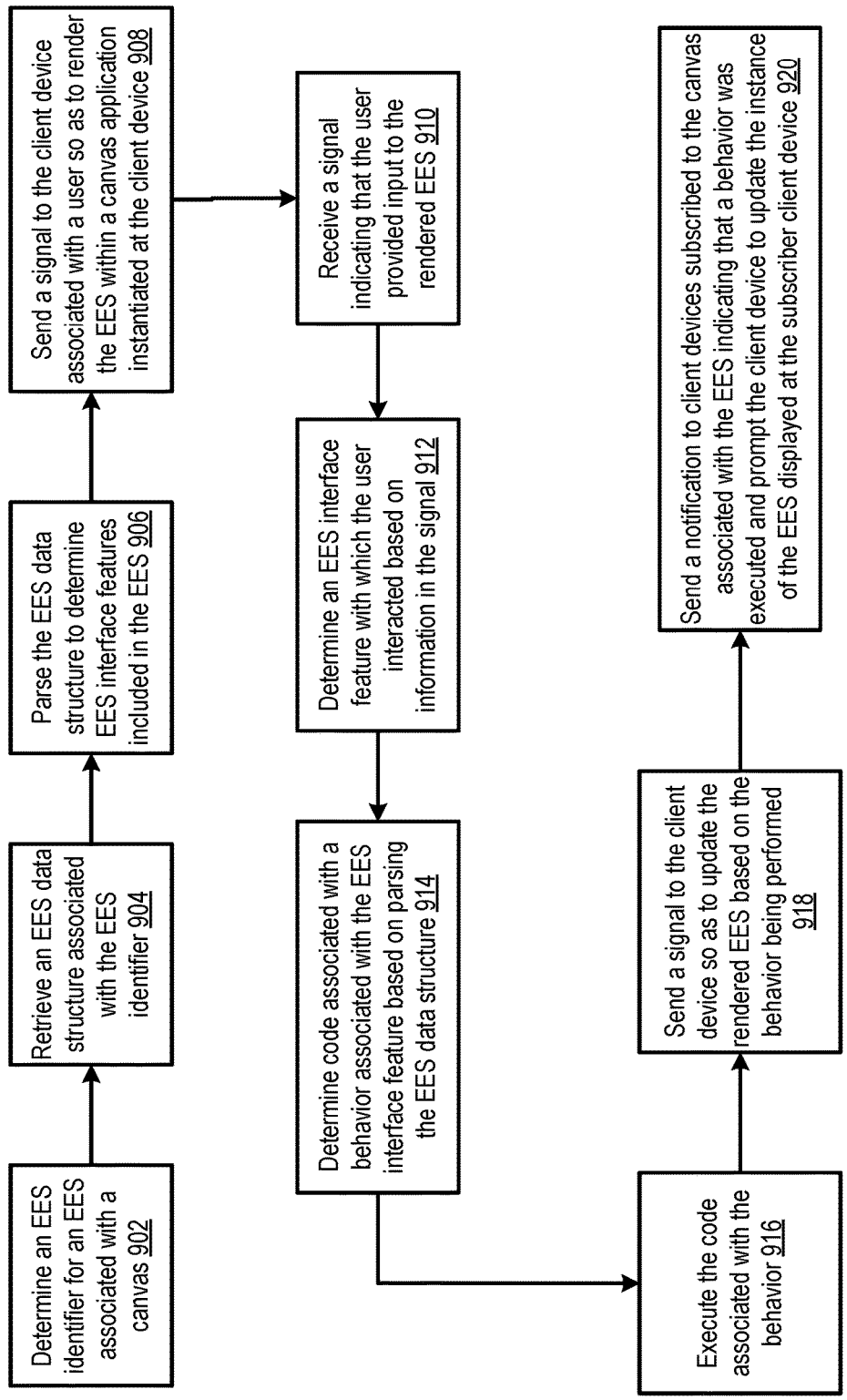
FIG. 9 is a logic flow diagram illustrating interacting with a live interactive application, according to an embodiment.

FIG. 9 is a logic flow diagram illustrating displaying the EES application, using the EES data structure. For example, in some implementations, the EES content management processor 202d can, at 902, determine an EES identifier associated with a canvas that has been selected by a user. For example, the EES content management processor 202d can check a list of EES identifiers stored at a canvas data structure to identify an EES data structure associated with the canvas. Alternatively, the EES content management processor 202d can search the canvas creation database 202 for an EES data structure that includes an identifier associated with the canvas. The EES content management processor 202d can, at 904, retrieve the EES data structure associated with the EES identifier, and can, at 906, parse the EES data structure to determine EES interface features (i.e., EES parts) included in the EES. For example, the EES content management processor 202d can determine if the user-defined EES includes buttons, text boxes, radio buttons, checkboxes, text, images, and/or other components. The EES content management processor 202d can, at 908, send a signal to a client device of the user that includes instructions for rendering each of the EES interface features of the EES data structure. For example, the EES content management processor 202d can send, to the client device, code and/or other information such that a canvas application implemented at the client device can display the EES interface features as specified by the user, so as to instantiate the EES application within the canvas.

The EES content management processor 202d can, at 910, receive a signal indicating that the user provided input to the rendered EES. For example, the user can click a button, enter text into a textbox, and/or can otherwise interact with the rendered EES. The client device of the user can send a signal to the EES content management processor 202d when the user has interacted with the EES instantiated at the client device. The EES content management processor 202d can, at 912, determine the EES interface feature with which the user has interacted (e.g., based on an EES interface feature identifier and/or name, and/or other information that identifies the EES interface feature). The EES content management processor 202d can, at 914, identify code associated with a behavior and/or action associated with that EES interface feature. The EES content management processor 202d can, at 916, execute that code associated with the behavior and/or action, and can, at 918, send a signal to the user's client device, so as to instruct the client device to update the rendered EES based on the action and/or behavior being performed. The EES content management processor 202d can, at 920, send a notification to client devices associated with subscribers to the canvas that includes the user's EES. In some implementations the notification can indicate that an action and/or behavior was performed as a result of the user interacting with the EES. The notification can also prompt the client devices of the subscribers to update an instance of the EES that is rendered in their canvas applications, when the subscribers are viewing the subscribed canvas.

As one non-limiting example, an EES can be a messaging application included in a private canvas. The example EES can include a text box and a button including a name field with "submit button." If a user includes a message in the text box and clicks the "submit button" button, the EES content management processor 202d can determine that the user has clicked that button by receiving the field "submit button" in the signal indicating that the user provided input to the EES. The EES content management processor 202d can then use the parsed data from the EES to determine that the "submit button" in the EES includes a behavior to display the text in the textbox in a message interface within the EES along with a username and timestamp. The EES content management processor 202d can determine the user-defined code to add the message to the message interface based on the parsed data, and can execute the action (e.g., by executing the code to add the message to the message interface, and by retrieving and/or adding a user name and a timestamp for the message). The EES content management processor 202d can then send a signal to the user's client device indicating that the message has been sent, and indicating that the EES rendered in the user's canvas application should be modified to show the new message in the message interface. The EES content management processor 202d can then send similar notifications to subscribers of the canvas that includes the EES, indicating that the user used the EES to send a message, and instructing the client devices of those subscribers to update their instances of the EES to render the new message in the message interface.

Figure 10:
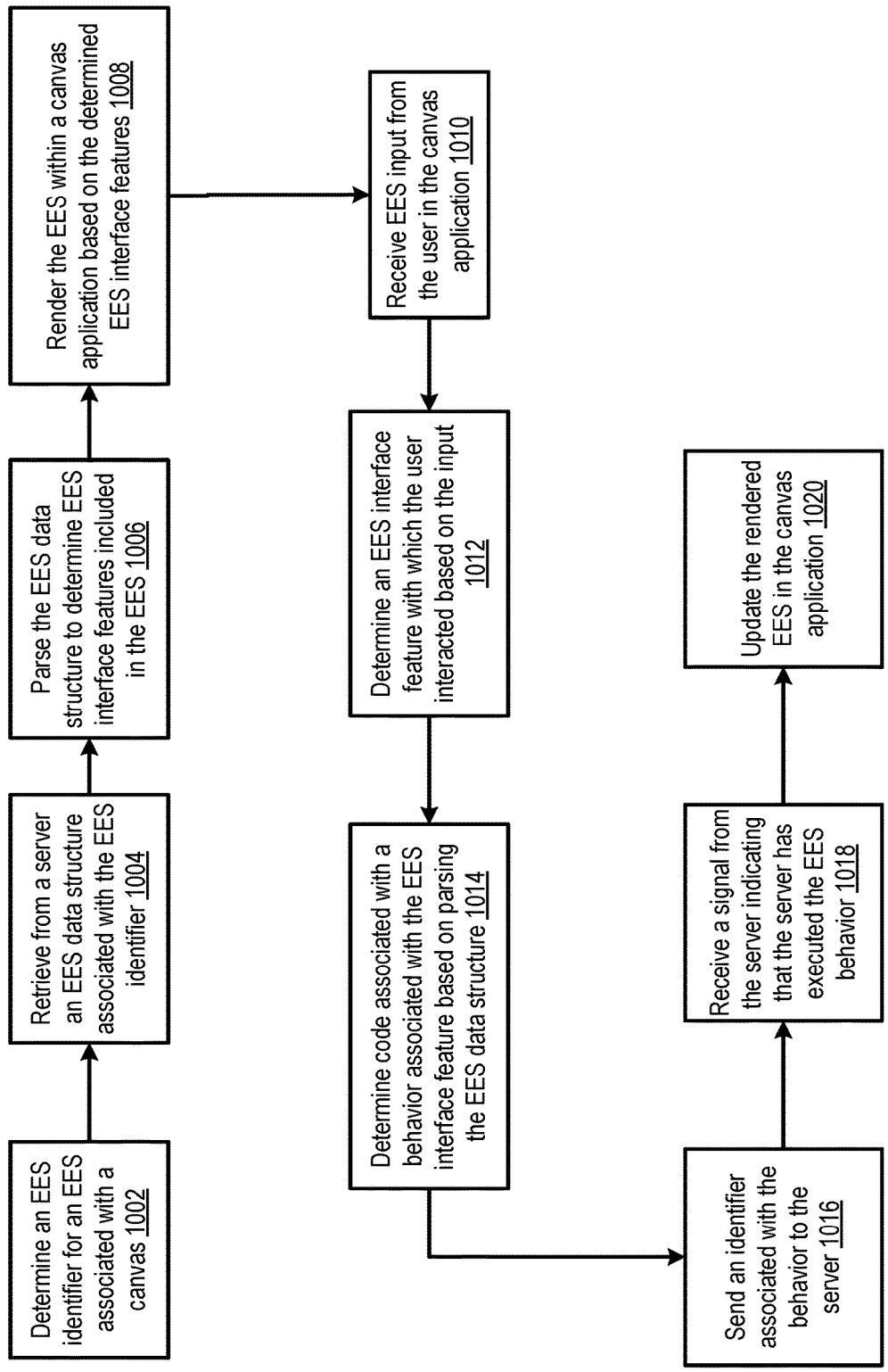
FIG. 10 is a logic flow diagram illustrating interacting with a live interactive application on a client device, according to an embodiment.

FIG. 10 is a logic flow diagram illustrating interacting with a live interactive application on a client device. For example, in some implementations, the user's client can, at 1002, determine an EES identifier for an EES associated with a canvas being accessed by the user (e.g., via a canvas application instantiated on the client device). The client device can, at 1004, retrieve an EES data structure associated with the EES identifier from the canvas server 104. The client device can, at 1006, parse the retrieved EES data structure to determine EES interface features included in the EES data structure. The client device can, at 1008, render those EES interface features within the canvas displayed in the canvas application. For example, the client device can send identifying information for the EES interface features included in the EES data structure to the canvas server 104, and can receive, from the canvas server 104, an indication of how to render the EES interface features in the canvas application. The client device can then display the EES by rendering those EES interface features in the canvas application.

The client device can, at 1010, receive EES input from the user in the canvas application, and can, at 1012, determine an EES interface feature with which the user interacted, based on that input. For example, if the user clicks a button, the client device, via the canvas application, can be notified that the user clicked the EES button, and can determine which button was pressed based on information in that notification that indicates which button was pressed. The client device can, at 1014, determine code associated with behaviors and/or other actions associated with the EES interface feature, e.g., based on the information obtained from parsing the EES data structure. The client device can, at 1016, send an identifier to the canvas server 104 that indicates the behavior that was associated with the EES interface feature. The client device can send the idenfier to the canvas server 104 such that the canvas server can execute code and/or other functionality that implements that EES interface feature. The client device can, at 1018, receive a signal from the canvas server 104 indicating that the server executed the behavior associated with that EES interface feature. The client device can, at 1020, update the rendered EES in the canvas application so as to reflect the behavior that was executed. For example, if the canvas server 104 executes a behavior that tallies a user's submissions to a survey, the client device can receive a signal from the canvas server 104 including instructions to update the EES rendered at the canvas application of the client device so as to reflect the new survey results generated as a result of the user's input.

Figure 11:
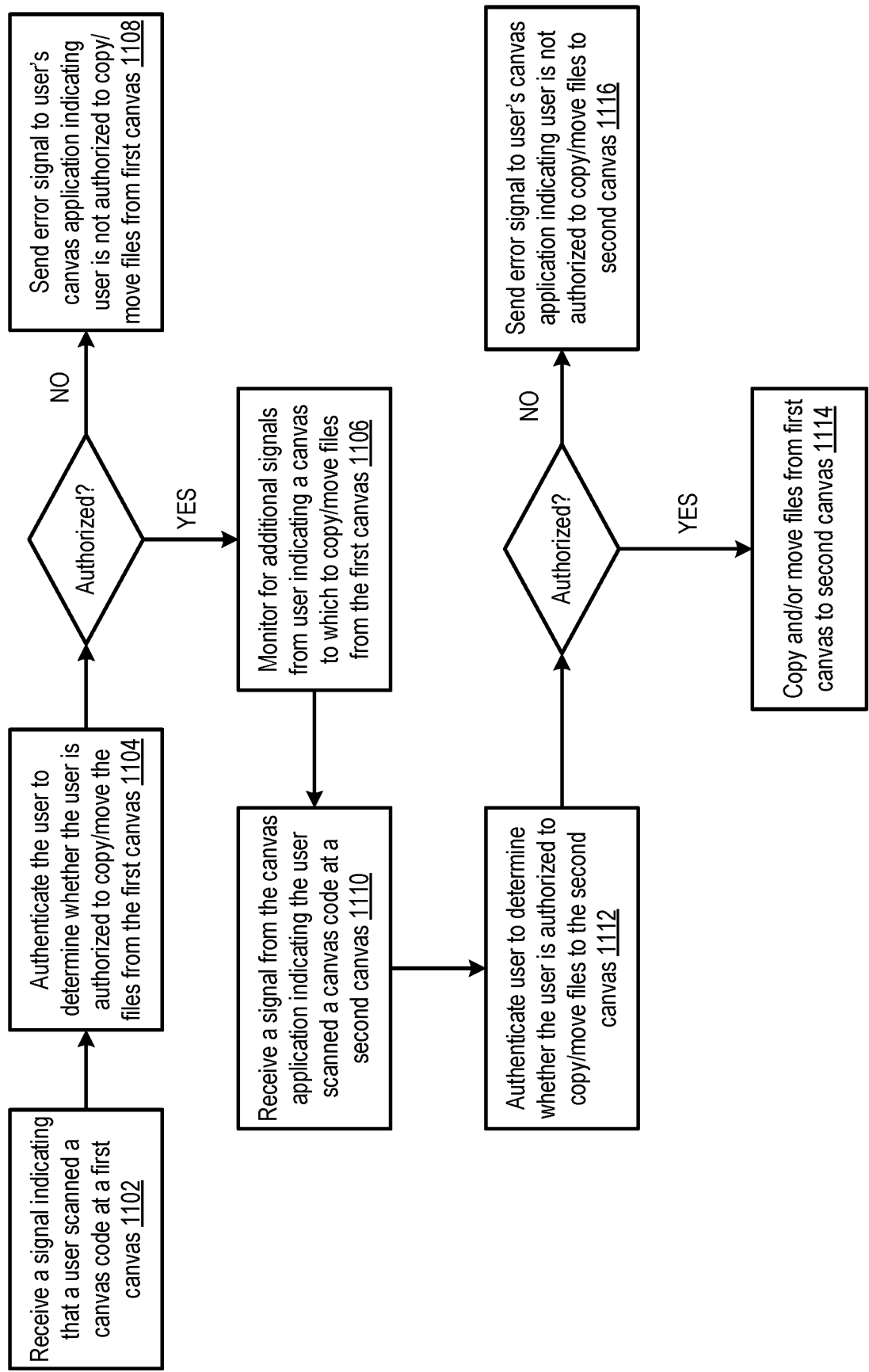
FIG. 11 is a logic flow diagram illustrating copying a canvas using canvas codes, according to an embodiment.

FIG. 11 is a logic flow diagram illustrating a process for copying a canvas using canvas codes, according to an embodiment. For example, in some implementations, a user can copy and/or move files associated with a first canvas to a second canvas by scanning a canvas code for each of the first canvas and the second canvas. For example, the user can scan the canvas code of the first canvas using her client device. A canvas application instantiated at the user's client device can send a signal to the canvas code management processor 202*b* indicating that the user scanned the canvas code, which includes a canvas identifier associated with the first canvas, a user identifier, and/or similar information. When the canvas code management processor 202*b*, at 1102, receives the signal, the canvas code management processor 202*b* can, at 1104, authenticate the user to determine whether or not the user is authorized to copy and/or move files from the first canvas. For example, in some implementations, the canvas code management processor 202*b* can determine whether the user identifier is included in a list of user identifiers stored at a data structure associated with the canvas identifier of the first canvas, where the list indicates a list of users who are authorized to copy and/or move files from the first canvas. If the user is authorized to copy and/or move the files, the canvas code management processor 202*b* can, 1106, continue to monitor communications from the user's client device to determine whether or not the canvas code management processor 202*b* has received an indication that the user has selected a canvas to which to copy and/or move the files. If the user is not authorized, the canvas code management processor 202*b* can, at 1108, send an error signal to the canvas application indicating that the user is not authorized to copy and/or move the files from the first canvas.

If the user is authorized, the user can, after scanning the canvas code of the first canvas, scan the canvas code of the second canvas. In scanning the canvas code of the second canvas, the user can automatically signal to the canvas application that the user wishes to copy and/or move files from the first canvas to the second canvas. The user can be optionally be presented with an option, after scanning the canvas code of the second canvas, to copy and/or move the files. Copying the files can cause the canvas code management processor 202*b* to duplicate the files and/or otherwise associate the files of the first canvas with the second canvas. Moving the files can cause the canvas code management processor 202*b* to copy the files to the second canvas, and to delete the files from the first canvas (e.g., to delete and/or remove identifiers of the files from the canvas data structure representing the first canvas). The canvas application can send a signal to the canvas code management processor 202*b* including an indication that the user selected a canvas to which to copy and/or move the files, as well as a canvas identifier of the second canvas, an action code (e.g., a code indicating whether or not the user would like to copy or paste the files), a user identifier, and/or similar information.

The canvas code management processor 202*b* can, at 1110, receive the signal, and can, at 1112, determine whether or not the user is authorized to copy and/or move files to the second canvas using a process similar to that described for the first canvas. If the user is authorized to copy and/or move files to the second canvas, the canvas code management processor 202*b* can, at 1114, copy and/or move files to the second canvas, in a manner similar to those described in the discussion of FIGS. 6-7B. For example, if the canvas code management processor 202*b* is instructed by the signal to copy the files, the canvas code management processor 202*b* can associate the files with the second canvas. If the canvas code management processor 202*b* is instructed by the signal to move the files, the canvas code management processor 202*b* can associate the files with the second canvas, and can disassociate the files with the first canvas. In some implementations, a user can alternatively create a stack of canvases by scanning the canvas code of a first canvas, scanning the canvas code of a second canvas, and indicating after scanning the canvas code of the second canvas (e.g., in a notification presented in the canvas application) that the user would like to create a stack of canvases based on the first canvas and the second canvas. The canvas code management processor 202*b* can then associate the first canvas with the second canvas, so as to create the stack, using a similar process as described in FIG. 1. If the user is not authorized to copy and/or move files to the second canvas, and/or to create a canvas stack with the second canvas, the canvas code management processor 202*b* can, at 1116, send an error signal to the canvas application indicating such.

It is intended that the systems and methods described herein can be performed by software (stored in memory and/or executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including Unix utilities, C, C++, Java™, Ruby, SQL, SAS®, the R programming language/software environment, Visual Basic™, and other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. Additional examples of computer code include, but are not limited to, control signals, encrypted code, and compressed code. Each of the devices described herein can include one or more processors as described above.

Some embodiments described herein relate to devices with a non-transitory computer-readable medium (also can be referred to as a non-transitory processor-readable medium or memory) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

While various embodiments have been described above, it should be understood that they have been presented by way of example only, and not limitation. Where methods and steps described above indicate certain events occurring in certain order, the ordering of certain steps may be modified. Additionally, certain of the steps may be performed concurrently in a parallel process when possible, as well as performed sequentially as described above. Although various embodiments have been described as having particular features and/or combinations of components, other embodiments are possible having any combination or sub-combination of any features and/or components from any of the embodiments described herein. Furthermore, although various embodiments are described as having a particular entity associated with a particular compute device, in other embodiments different entities can be associated with other and/or different compute devices.

The invention claimed is:

1. A method, comprising:
allocating a first portion of a memory of a first user device to serve as a first shared memory space for at least one dynamic application object;
instantiating a first user interface on a display associated with the first user device based on a content of the first shared memory space;
allocating a first portion of a memory of a second user device to serve as a second shared memory space for at least one dynamic application object;
instantiating a second user interface on a display associated with the second user device based on a content of the second shared memory; and
maintaining on a compute device a registry identifying the first shared memory space and the second shared memory space, the registry including access control information for each of the first shared memory space and the second shared memory space, the access control information defining permission to access the first shared memory space and the second shared memory space by user devices other than the first user device and the second user device.

2. The method of claim 1, further comprising:
receiving at the compute device a request from a third user device to receive a copy of the instantiated first user interface;
approving the request from the third user device with reference to the access control information; and
instructing the first user device to share a copy of the instantiated first user interface with the third user device.

3. The method of claim 2, further comprising:
editing the shared memory space at the first user device to modify its content of at least one dynamic application object; and
notifying the compute device that the first shared memory space has been edited; and
notifying the third user device that the first shared memory space has been edited.

4. The method of claim 3, wherein the notifying the third user device is performed by the compute device.

5. The method of claim 1, further comprising;
receiving at the compute device requests from a plurality of user devices to receive a copy of the instantiated first user interface;
approving fewer than all of the requests with reference to the access control information; and
instructing the first user device to share a copy of the instantiated first user interface with user devices from the plurality of user devices whose requests were approved.

6. The method of claim 5, further comprising:
deleting the first shared memory space on the first user device;
notifying the compute device that the first shared memory space has been deleted; and
deleting shared copies of instantiations of the first user interface from user devices from the plurality of user devices whose requests were approved.

7. The method of claim 1, further comprising:
associating an identification code with the first user interface; and
displaying the identification code upon the display of the first user interface.

8. The method of claim 7, further comprising;
capturing the identification code on a third user device;
generating at the third user device a request for a copy of the first user interface using the identification code;
receiving the request for a copy of the first user interface at the compute device;
approving the request from the third user device; and
instructing the first user device to share a copy of the instantiated first user interface with the third user device.

9. A method, comprising:
generating a plurality of shareable canvases on a first user device that is configured to share access to the plurality of shareable canvasses, each shareable canvas from the plurality of shareable canvasses including a corresponding allocated portion of a memory of the first user device and configured to provide an associated instantiated interface on a display associated with the first user device;
linking a subset of shareable canvasses from the plurality of shareable canvasses to provide a first canvas stack including the subset of shareable canvasses; and
allowing a second user device to access the first canvas stack.

10. The method of claim 9, further comprising:
generating a second stack of shareable canvasses at a third user device;
associating, at a compute device, the first stack of shareable canvasses and the second stack of shareable canvasses with a first canvas network;
storing, at the compute device, first access control information for use in determining permissions to access the first stack of shareable canvasses; and
storing, at the compute device, second access control information for use in determining permissions to access the first stack of shareable canvasses.

11. The method of claim 10, further comprising:
receiving, at the compute device, a request from a fourth user device to access a shareable canvas of the first canvas network; and
with reference to the first access control information, allowing the fourth user device access to at least one, but not all of the shareable canvasses of the first canvas stack.

12. The method of claim 9, further comprising:
generating a second stack of shareable canvasses at a third user device;
associating, at a compute device, the first stack of shareable canvasses and the second stack of shareable canvasses with a first canvas network;
storing, at the compute device, first access control information for use in determining first permissions to access the first stack of shareable canvasses; and
storing, at the compute device, second access control information for use in determining second permissions to access the first stack of shareable canvasses.

13. A method, comprising:
receiving, at a compute device, a signal indicating a first portion of a memory of a first user device being allocated to serve as a first shared memory space for a first dynamic application object, a first user interface being instantiated on a display associated with the first user device based on a content of the first shared memory space;
receiving, at the compute device, a signal indicating a first portion of a memory of a second user device being allocated to serve as a second shared memory space for a second dynamic application object, a second user interface being instantiated on a display associated with the second user device based on a content of the second shared memory; and
maintaining on the compute device a registry identifying the first shared memory space and the second shared memory space, the registry including access control information for each of the first shared memory space and the second shared memory space, the access control information defining permission to access the first shared memory space and the second shared memory space by user devices other than the first user device and the second user device.

14. The method of claim 13, further comprising:
receiving, at the compute device and from a third user device, a request to receive a copy of the instantiated first user interface;
approving, at the compute device, the request from the third user device with reference to the access control information; and
sending a signal to instruct the first user device to share a copy of the instantiated first user interface with the third user device.

15. The method of claim 14, further comprising:
receiving, at the compute device and from the first user device, a signal notifying the server that the first shared memory space has been edited to modify its content of the first dynamic application object; and
sending, from the compute device and to the third user device, a signal notifying the third user device that the first shared memory space has been edited.

16. The method of claim 13, further comprising;
receiving at the compute device requests from a plurality of user devices to receive a copy of the instantiated first user interface;
approving fewer than all of the requests with reference to the access control information; and
sending a signal to instruct the first user device to share a copy of the instantiated first user interface with user devices from the plurality of user devices whose requests were approved.

17. The method of claim 16, further comprising:
receiving, at the compute device and from the first user device, a notification that the first shared memory space has been deleted; and
sending, from the compute device and to each user device from the plurality of user devices whose requests were approves, a signal to delete shared copies of instantiations of the first user interface from that user devices.

18. The method of claim 13, further comprising:
receiving, at the compute device, a request for a copy of the first user interface that is associated with an identification code displayed on the display of the first user interface and captured on the third user device;
approving, at the compute device, the request from the third user device; and
sending, from the compute device and to the first user device, a signal to instruct the first user device to share a copy of the instantiated first user interface with the third user device.

* * * * *